US008678879B2

(12) United States Patent
Araki et al.

(10) Patent No.: US 8,678,879 B2
(45) Date of Patent: Mar. 25, 2014

(54) GRINDING MACHINE AND MEASURING APPARATUS

(75) Inventors: Yoshiaki Araki, Nanto (JP); Takashi Imai, Nanto (JP)

(73) Assignee: Komatsu Ntc Ltd., Tokyo (JP)

( * ) Notice: Subject to any disclaimer, the term of this patent is extended or adjusted under 35 U.S.C. 154(b) by 602 days.

(21) Appl. No.: 12/993,910

(22) PCT Filed: Jul. 28, 2010

(86) PCT No.: PCT/JP2010/062718
§ 371 (c)(1),
(2), (4) Date: Nov. 22, 2010

(87) PCT Pub. No.: WO2011/013710
PCT Pub. Date: Feb. 3, 2011

(65) Prior Publication Data
US 2011/0237159 A1    Sep. 29, 2011

(30) Foreign Application Priority Data

Jul. 28, 2009  (JP) ................................. 2009-175691

(51) Int. Cl.
*B24B 5/37* (2006.01)
*B24B 49/00* (2012.01)
(52) U.S. Cl.
USPC .............................................. 451/8; 451/49
(58) Field of Classification Search
USPC ........................................ 451/49, 5, 8, 9, 10
See application file for complete search history.

(56) References Cited

U.S. PATENT DOCUMENTS 1,941,456 A    1/1934  Arnold
6,067,721 A    5/2000  Dall Aglio et al.
(Continued)

FOREIGN PATENT DOCUMENTS

EP    903199 A3    7/1999
JP    11513317 A   11/1999
(Continued)

OTHER PUBLICATIONS

International Preliminary Report on Patentability issued Feb. 7, 2012 in International Application No. PCT/JP2010/062718, 6 pages.
(Continued)

*Primary Examiner* — Robert Rose
(74) *Attorney, Agent, or Firm* — Fish & Richardson P.C.

(57) ABSTRACT

A first grinding head is provided on a base frame via a first movable body and a first grinding base. The proximal portion of the tilt arm is tiltably fitted in the housing of the grinding head. A measuring device is rotatably coupled to a distal portion of the tilt arm. A gauge and a measuring pin are coupled to the lower end of the measuring device, and the gauge is engaged with a crankpin of a crankshaft. A tilt center of the tilt arm is arranged on the same axis as the rotation center of the first grindstone ISA. When the tilt arm is tilted, the position of the measuring device is changed, accordingly. However, since the relational relationship between the first grindstone ISA and the gauge is not changed, the position of the gauge is easily adjusted in accordance with the diameter of the crankpin. Accordingly, a grinding machine is provided that simplifies the movement path of the gauge of the measuring device, thereby allowing the outer diameter of the workpiece to be quickly measured.

20 Claims, 19 Drawing Sheets

(56) References Cited

U.S. PATENT DOCUMENTS

| | | | |
|---|---|---|---|
| 6,411,861 B1 | 6/2002 | Clewes et al. | |
| 6,645,047 B1 * | 11/2003 | Liskow | 451/9 |
| 8,336,224 B2 * | 12/2012 | Arnold | 33/555.1 |
| 2002/0020075 A1 | 2/2002 | Dall'Aglio et al. | |
| 2003/0056386 A1 | 3/2003 | Danielli et al. | |
| 2004/0055172 A1 | 3/2004 | Danielli | |
| 2004/0072521 A1 * | 4/2004 | Pflager et al. | 451/415 |
| 2011/0239478 A1 * | 10/2011 | Dall'Aglio et al. | 33/555.3 |

FOREIGN PATENT DOCUMENTS

| | | |
|---|---|---|
| JP | 2001038618 A | 2/2001 |
| JP | 2002052465 A | 2/2002 |
| JP | 2003127061 A | 5/2003 |
| JP | 2003526094 A | 9/2003 |
| JP | 2004522601 A | 7/2004 |
| JP | 2005195484 A | 7/2005 |
| JP | 2007185768 A | 7/2007 |
| WO | WO9712724 A1 | 4/1997 |
| WO | WO0166306 A1 | 2/2002 |
| WO | WO02070195 A1 | 9/2002 |

OTHER PUBLICATIONS

Chinese Office Action dated Mar. 28, 2012 in Chinese Patent Application No. 201080001721.4, and partial English translation thereof, 6 pages.

Supplementary European Search Report dated Apr. 4, 2013 from European Application No. 10804456.1, in English, 4 pages.

* cited by examiner

Fig.5
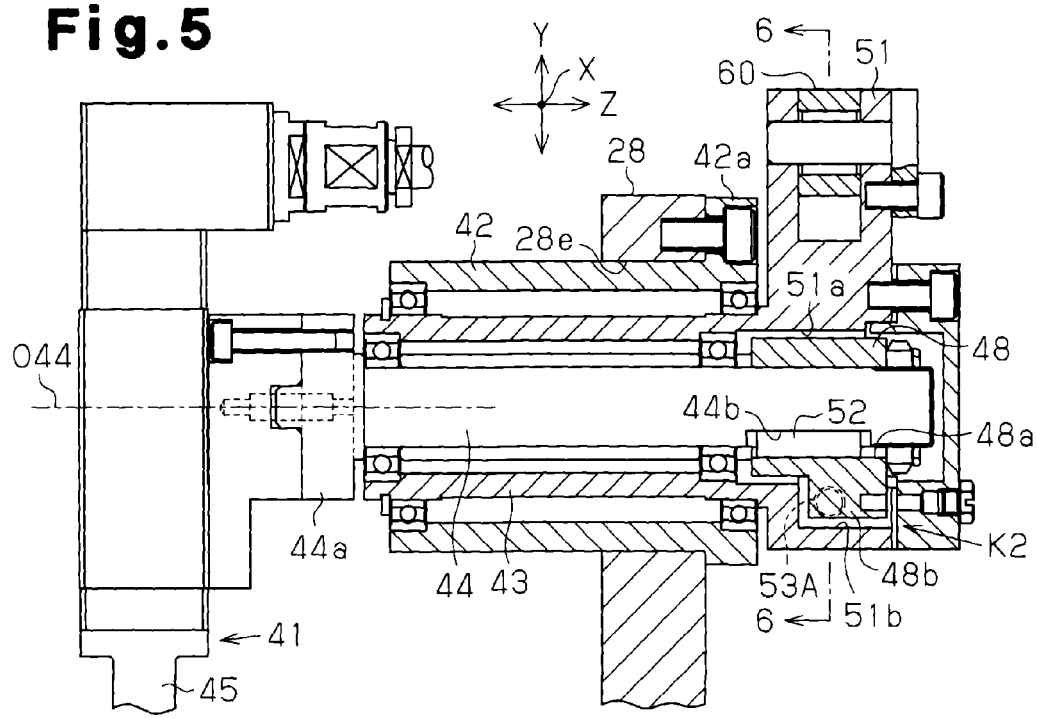
Fig.6(a)
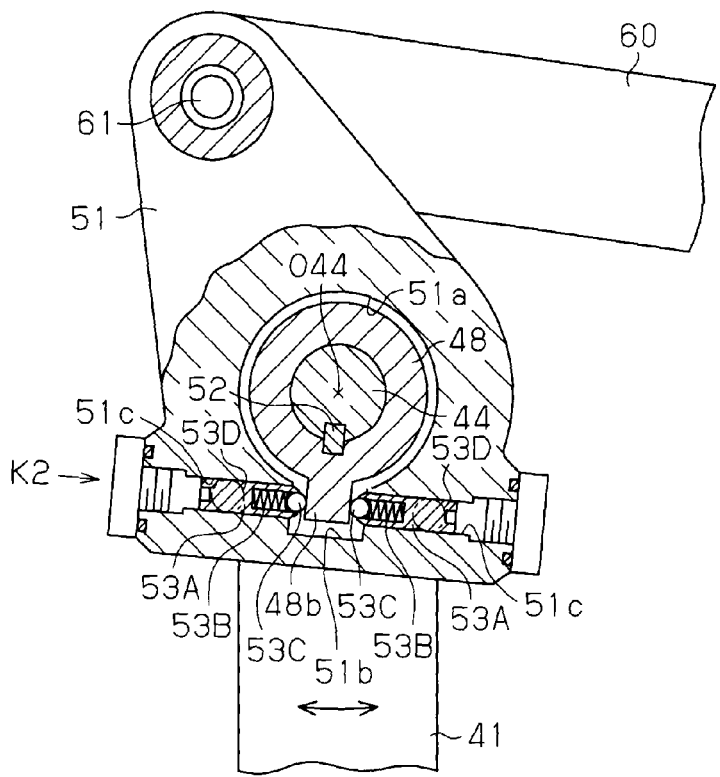
Fig.6(b)

GRINDING MACHINE AND MEASURING APPARATUS

CROSS REFERENCE TO RELATED APPLICATIONS

This application claims priority to Application No. PCT/JP2010/062718 filed on Jul. 28, 2010, which application claims priority to Application No. JP 2009-175691 filed on Jul. 28, 2009. The entire contents of both applications are incorporated herein by reference in their entireties.

FIELD OF THE INVENTION

The present invention relates to a grinding machine for grinding workpieces such as crankshafts, and more particularly, to a grinding machine having a measuring apparatus for measuring the outer diameter of the columnar portion of a workpiece such as crankpins and to the measuring apparatus.

BACKGROUND OF THE INVENTION

A grinding machine has a measuring apparatus. Such an apparatus measures the outer diameter of a columnar portion of a workpiece, thereby monitoring the state of grinding of the columnar portion performed by the grinding machine.

As one such type of measuring apparatus for a grinding machine, the configuration disclosed, for example, in Patent Document 1 has been proposed. This grinding machine will now be described with reference to FIGS. 24 and 25. A rotary shaft 103 of a motor (not shown) is supported on the upper surface of a grinding base 101, which can be reciprocated, via a pillow block 102. A grindstone 104 is coupled to the distal end of the rotary shaft 103.

A measuring apparatus 111 is attached to the pillow block 102 to measure the outer diameter of a crankpin 106a of a crankshaft 106. The measuring apparatus 111 is configured as follows. That is, a first tilt arm 114 is supported on the upper surface of the pillow block 102 via a bracket 112, and a support shaft 113, so as to be vertically tiltable. A second tilt arm 116 is coupled to the distal end of the first tilt arm 114 via a coupler shaft 115, so as to be vertically tiltable.

A tubular case 117 is supported at the distal end of the second tilt arm 116, and an operation rod 118 is movably received in the tubular case 117. A pin of a measuring device 119 is attached to the distal end of the operation rod 118. The pin of the measuring device 119 contacts the outer circumferential surface of the crankpin 106a of the crankshaft 106 to measure the outer diameter of the crankpin 106a. A support block 120 is attached to the tubular case 117. A gauge 121 is attached to the support block 120. The gauge 121 is formed to engage with the outer circumferential surface of the crankpin 106a. A guide member 122 is attached to the support block 120. The guide member 122 guides the gauge 121 toward the crankpin 106a. The measuring device 119 is hooked to the crankpin 106a by means of the weight of the first tilt arm 114 and other members.

A cylinder 123 for tilting the first tilt arm 114 is attached to the bracket 112. A weight 125 is coupled to the first tilt arm 114 to maintain the weight balance as shown in FIG. 24. When a piston rod 124 of the cylinder 123 is moved rightward as viewed in FIG. 24, so as to push the weight 125, the first tilt arm 114, the second tilt arm 116, the support block 120, and the gauge 121 are moved from a measurement position shown in FIG. 24 to a home position shown in FIG. 25.

PRIOR ART DOCUMENT

Patent Document

Patent Document 1: Japanese Laid-Open Patent Publication No. 2007-185768

SUMMARY OF THE INVENTION

In the measuring apparatus 111 of the above described grinding machine, the tilt axis 0114 of the first tilt arm 114 is spaced away from the rotation center 0104 of the grindstone 104. This causes the following problems.

That is, the movement path of the coupler shaft 115, which couples the first tilt arm 114 and the second tilt arm 116 together, is not coaxial with the center 0104 of the grindstone 104. Therefore, when the gauge 121 at the home position shown in FIG. 25 is moved to the measurement position shown in FIG. 24, where the gauge 121 contacts the crankpin 106a, the first tilt arm 114 needs to be tilted counterclockwise about the tilt axis 0114. At the same time, the second tilt arm 116 needs to be tilted clockwise about a tilt axis 0116.

The gauge 121 and the pin of the measuring device 119 contact the outer circumferential surface of the crankpin 106a, which reciprocates vertically while contacting the outer circumferential surface of the grindstone 104. This operation is referred to as gauge application. If the guide member 122 is not provided, the gauge application can be performed at a limited position, that is, only when the rotating crankpin 106a is stopped at the uppermost position.

Specifically, when proper gauge application is attempted on the rotating crankpin 106a, the tilt angle of the first tilt arm 114 and the tilt angle of the second tilt arm 116 each need to be suitable values corresponding to the rotational position of the crankpin 106a. However, such setting is practically impossible. Therefore, at the gauge application described above, the rotation has to be stopped when the crankpin 106a is at the highest position. This extends the time required for the gauge to be applied and disengaged.

According to the Patent Document 1, the guide member 122 is attached to the support block 120 to reduce the time required for the gauge to be applied and disengaged. Regardless of the rotational position of the crankpin 106a, the guide member 122 is made to contact the crankpin 106a, so as to perform the gauge application of the gauge 121.

To shorten the time required for the gauge to be applied and disengaged, the guide member 122 is attached to the support block 120 in the structure shown in FIGS. 24 and 25, so as to cause the guide member 122 to contact the rotating crankpin 106a. The gauge 121 is held to correspond to the crankpin 106a. In this state, the first tilt arm 114 and the second tilt arm 116 are tilted to perform the gauge application.

However, the diameter and the vertical stroke of the crankpin 106a of the machined crankshaft greatly vary. Therefore, in accordance with the type of crankshaft, the position of the gauge application needs to be adjusted. This makes the operation problematic. Also, when the gauge 121 contacts the crankpin 106a, great impact can occur. In such a case, the life of a part that contacts the crankpin 106a is shortened. Further, since the measuring apparatus 111 has the downward projecting guide member 122, the tilt arm 116 needs to be at an upper retreat position before the gauge application, so as to prevent the guide member 122 from contacting the crankpin 106a. This extends the distance between the rotation range of the crankpin 106a and the gauge 121. Thus, even if the gauge application is performed at appropriate timing, impact can occur when the crankpin 106a and the gauge 121 contact each other, as in the above described case.

Further, since the tilt axis 0114 of the first tilt arm 114 is off the rotation center 0104 of the grindstone 104, the gauge 121 or the guide member 122 can hit the grindstone 104 if the tilt arm 114 is lowered in a state where no crankpin 106a is being machined.

Accordingly, it is an objective of the present invention to provide a grinding machine and a measuring apparatus that allow easy and smooth gauge application to the outer circumferential surface of a columnar part of a workpiece and ensure accurate measurement of a measuring device.

To achieve the foregoing objective and in accordance with the present invention, a grinding machine is provided that includes a grindstone, a tilt arm, and measuring means provided at a distal portion of the tilt arm. The grinding machine causes the grindstone to contact a shaft-like workpiece that is rotated about an axis to grind the workpiece. The tilt arm is tilted about another axis, and the measuring means measures an outer diameter of the workpiece. The rotation center of the grindstone and the tilt center of the tilt arm are arranged on a common axis.

According this invention, the rotation path of the measuring device at the distal portion of the tilt arm is an arcuate path the center of which coincides with the rotation center of the grindstone. Therefore, the rotation path of the measuring apparatus corresponds to the movement path of the workpiece, which is ground by the grindstone, so that the gauge application and disengagement can be performed smoothly and quickly.

In the above configuration, the workpiece is preferably a crankshaft, and a crankpin of the rotating crankshaft is preferably ground by reciprocating the grindstone. This allows the crankpin to be efficiently ground.

The measuring means is preferably supported at the distal portion of the tilt arm to be rotatable about an axis parallel to the axis of the tilt arm, and the grinding machine preferably includes adjusting means for adjusting the rotation angle of the measuring means. In this case, the measuring means can be located at a position suitable for measuring the pin diameter. Also, at the dressing of the grindstone, the measuring means can be located at a position where it does not hinder the dressing.

Angle adjusting means for adjusting the tilt angle of the tilt arm is preferably provided, and the angle adjusting means is preferably capable of adjusting the position of the measuring means about the tilt center of the tilt arm. This allows the position of the measuring means to be freely adjusted relative to the workpiece. For example, regardless of the type of workpiece, a standby position for the measuring piece, at which the measuring means contacts the workpiece, can be made sufficiently close to the workpiece. Accordingly, the gauge application and gauge disengagement can be performed over a short distance, and the time required for the gauge application and the gauge disengagement are reduced. Also, an impact at the gauge application can be reduced.

The angle adjusting means preferably includes urging means for urging the tilt arm in one tilting direction and a first motor, and the first motor preferably actuates an actuating element, which is selectively contacts and separates from the tilt arm, thereby rotating the tilt arm against the urging force of the urging means. In this case, the operation of the first motor accurately moves the measuring means to a predetermined position.

The adjusting means preferably includes a driven lever integrally rotated with the measuring means, another driven lever rotated by drive means, and a link coupling the driven levers together.

The drive means includes a second motor and an actuating element driven by the second motor. The actuating element has an arcuate surface the shape of which conforms to an arc the center of which coincides with the tilt center of the tilt arm, and wherein the arcuate surface is engaged with said another driven lever so that said another driven lever is rotated. The arcuate surface is preferably engaged with said another driven lever so that said another driven lever is rotated. This allows the actuating element, on which the arcuate surface is formed, to properly rotate the driven lever.

Holding means is preferably provided that always maintains the measuring means at a neutral position and allows the measuring means to be rotated by an external force. In this case, when the grindstone is slightly worn, it is not necessary to set the rotation range of the tilt arm and the measuring device through computation again. However, since the measuring device is allowed to rotate from the neutral position, it is possible to cope with a change in the grinding range due to abrasion of the grindstone.

The measuring means is preferably held at the neutral position via force of a spring.

A reducing means is preferably provided that reduces the load due to the weight of the tilt arm and the measuring means when the measuring means is located at a position for measuring the outer diameter of the workpiece. This reduces the measurement load acting on the workpiece, allowing accurate machining and measurement of the workpiece.

The reducing means is preferably formed by a spring. When the spring has passed a dead point, the reducing means reduces the load.

Load adjusting means is preferably provided that adjusts the degree by which the reducing means reduces the load. In this case, a proper load can be obtained at measurement.

The tilt arm preferably has an arcuate portion the center of which coincides with the center of the tilt arm, and the arcuate portion is preferably received in a hole in an apparatus cover. This prevents the tilt arm from moving toward the opening face in the hole formed in the cover. Accordingly, the size of the hole in the cover can be reduced to prevent entry of coolant.

The tilt arm and the link each preferably have an arcuate portion the center of which coincides with the center of the tilt arm and the center of the link, and the arcuate portions are preferably each received in a hole in an apparatus cover. As in the previous case, this prevents the tilt arm and the link from moving toward the opening face in the holes formed in the cover. Accordingly, the size of the holes in the cover can be reduced to prevent entry of coolant.

Workpiece type identifying means is preferably provided that identifies the type of the workpiece by using the measuring means. In this case, it is possible to detect workpieces of different types, and to read a machining program suitable for the type of workpiece. Accordingly, the grinding can be properly executed.

The workpiece type identifying means preferably checks the data of the pin diameter detected by the measuring means and the length of the crank arm against data of workpiece types stored in advance.

In accordance with an invention related to a measuring apparatus, the measuring apparatus includes a tilt arm and a measuring device. The tilt arm has an attachment portion, and the attachment portion is attached to a support portion of a grinding machine such that the tilt arm is tiltable about the rotation center of a grindstone of the grinding machine. The measuring device is supported at the distal end of the tilt arm so as to be rotatable about another rotation center parallel to the rotation center of the grindstone. The measuring device measures a pin diameter of a crankpin.

BRIEF DESCRIPTION OF THE DRAWINGS

FIG. 5 is a cross-sectional view illustrating the measuring device when attached to a tilt arm;

FIG. 6(a) is a cross-sectional view taken along line 6-6 of FIG. 5;

FIG. 6(b) is a partial cross-sectional view of FIG. 6(a);

DETAILED DESCRIPTION OF THE PREFERRED EMBODIMENTS

First Embodiment

A two-head type grinding machine according to a first embodiment of the present invention will now be described with reference to FIGS. 1 to 13.

Figure 1:
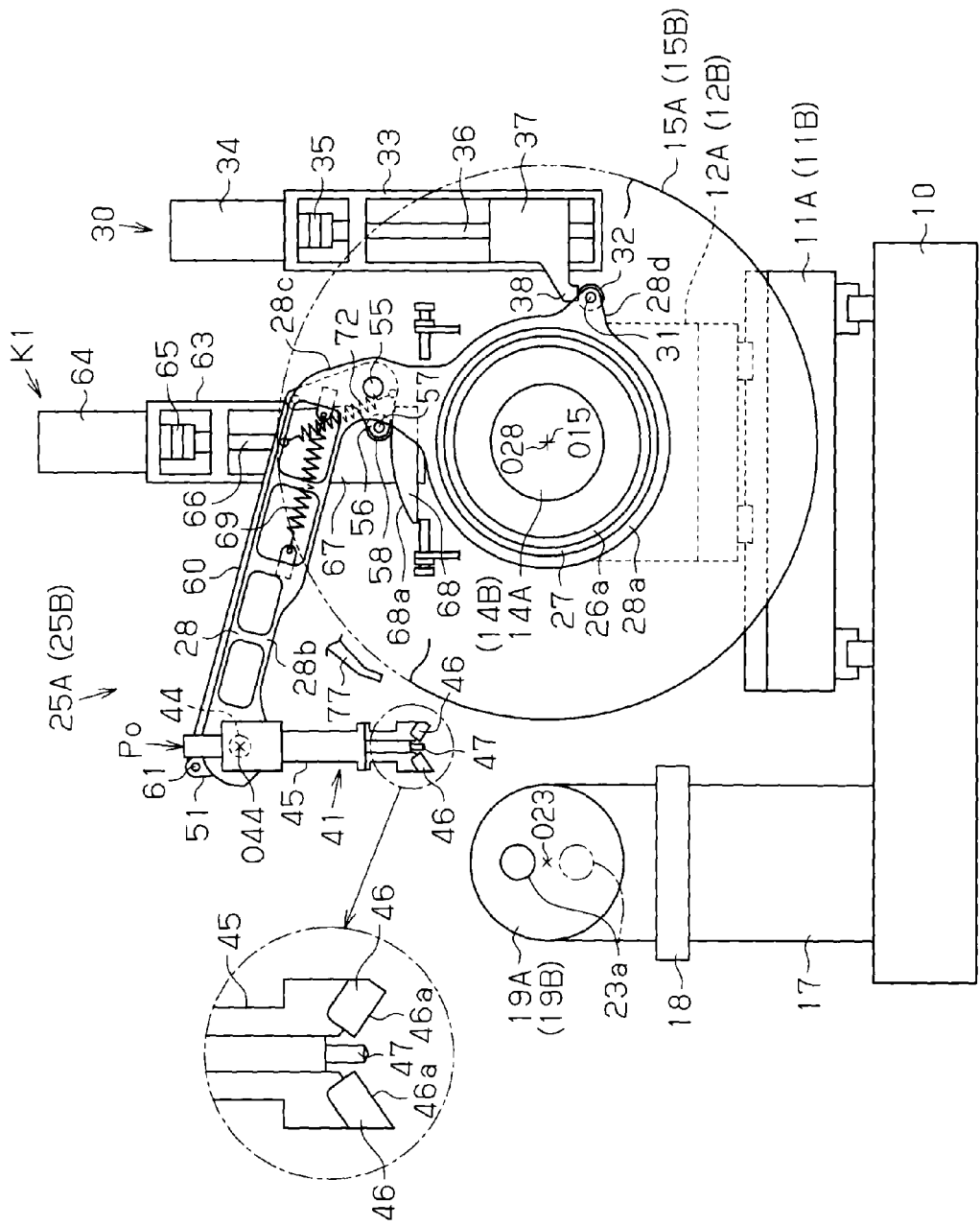
FIG. 1 is a right side view illustrating a non-grinding state of a two-head type grinding machine according to a first embodiment of the present invention.
Figure 2:
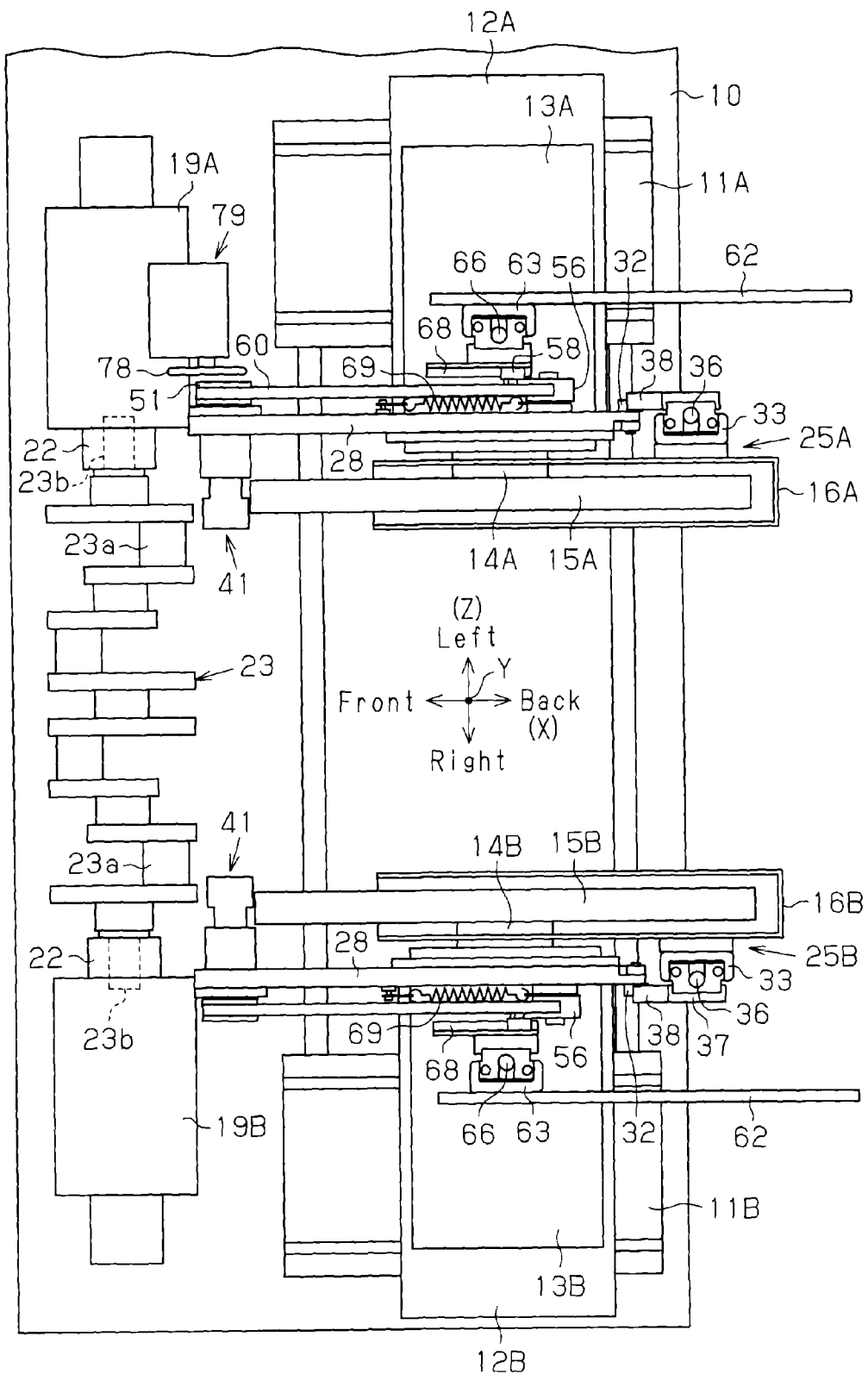
FIG. 2 is a plan view illustrating a non-grinding state of the two-head type grinding machine.

As shown in FIGS. 1 and 2, first and second movable bodies 11A, 11B are arranged on left and right positions (upper and lower positions as viewed in FIG. 2) of the upper surface of a base frame 10. The first and second movable bodies 11A, 11B are supported by a Z-axis drive mechanism so as to be reciprocated in a Z-direction (vertical axis as viewed in FIG. 2). Movable bodies as grinding bases (hereinafter, referred to as first and second grinding bases 12A, 12B) are attached to the upper surfaces of the movable bodies 11A, 11B, so as to reciprocate in the direction of X-axis (left-right direction in FIGS. 1 and 2) via an X-axis drive mechanism. Grinding heads 13A, 13B formed by motors are fixed to the upper surfaces of the grinding bases 12A, 12B. A first grindstone 15A and a second grindstone 15B are fixed to rotary shafts 14A, 14B of the grinding heads 13A, 13B, respectively. As shown in FIG. 2, covers 16A, 16B are attached to the grinding bases 12A, 12B to cover the first and second grindstones 15A, 15B, respectively.

Main spindle devices 19A, 19B are attached to the upper surface of the base frame 10 via an attachment member 17 and a base 18 such that the positions of the main spindle devices 19A, 19B are adjustable in the Z-axis direction. A clamp mechanism 22 is coupled to the rotary shaft of the motor of each main spindle device 19A, 19B. A workpiece, which is a crankshaft 23, is clamped by the clamp mechanisms 22 at both ends. The positions of the main spindle devices 19A, 19B are adjusted in the Z-axis direction according to the length of the crankshaft 23.

The crankshaft 23 has columnar portions, which are a plurality of crankpins 23a (the number of which is, for example, four).

Figure 3:
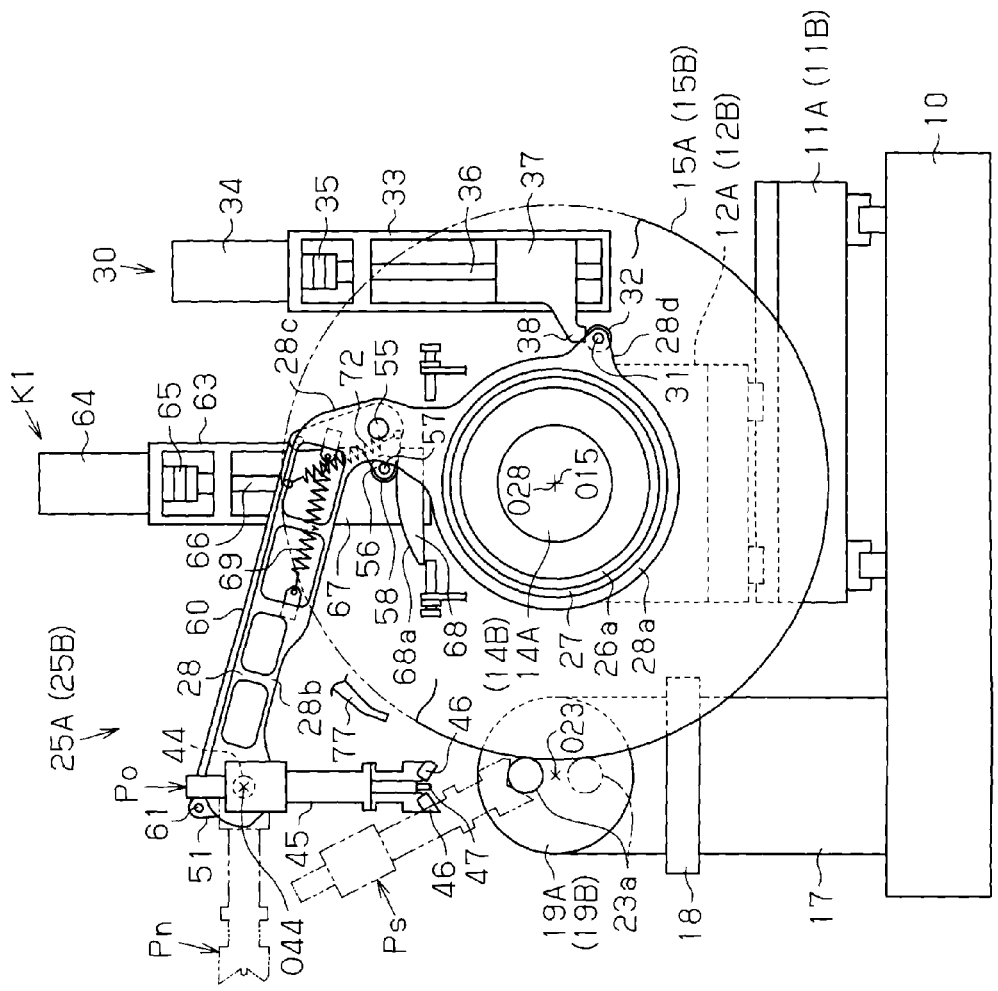
FIG. 3 is a right side view illustrating a grinding state of the two-head type grinding machine.

When the motors of the main spindle devices 19A, 19B are rotated, the crankpins 23a of the crankshaft 23 attached to the clamp mechanisms 22 rotate, or orbit, about the center 023 of the crankshaft 23. As shown in FIG. 3, the rotating first and second grindstones 15A, 15B each contact the outer circumferential surface of a crankpin 23a. Also, the grindstones 15A, 15B are moved in a reciprocating manner along the X-axis direction in synchronization with the rotation of the crankpins 23a, thereby grinding the outer circumferential surface of the crankpins 23a.

Measuring apparatuses 25A, 25B will be described that measure the outer diameters of crankpins 23a of the crankshaft 23 at two positions during grinding of the crankpins 23a. Since the measuring apparatuses 25A, 25B have the same structure, only the measuring apparatus 25A will be described.

Figure 4:
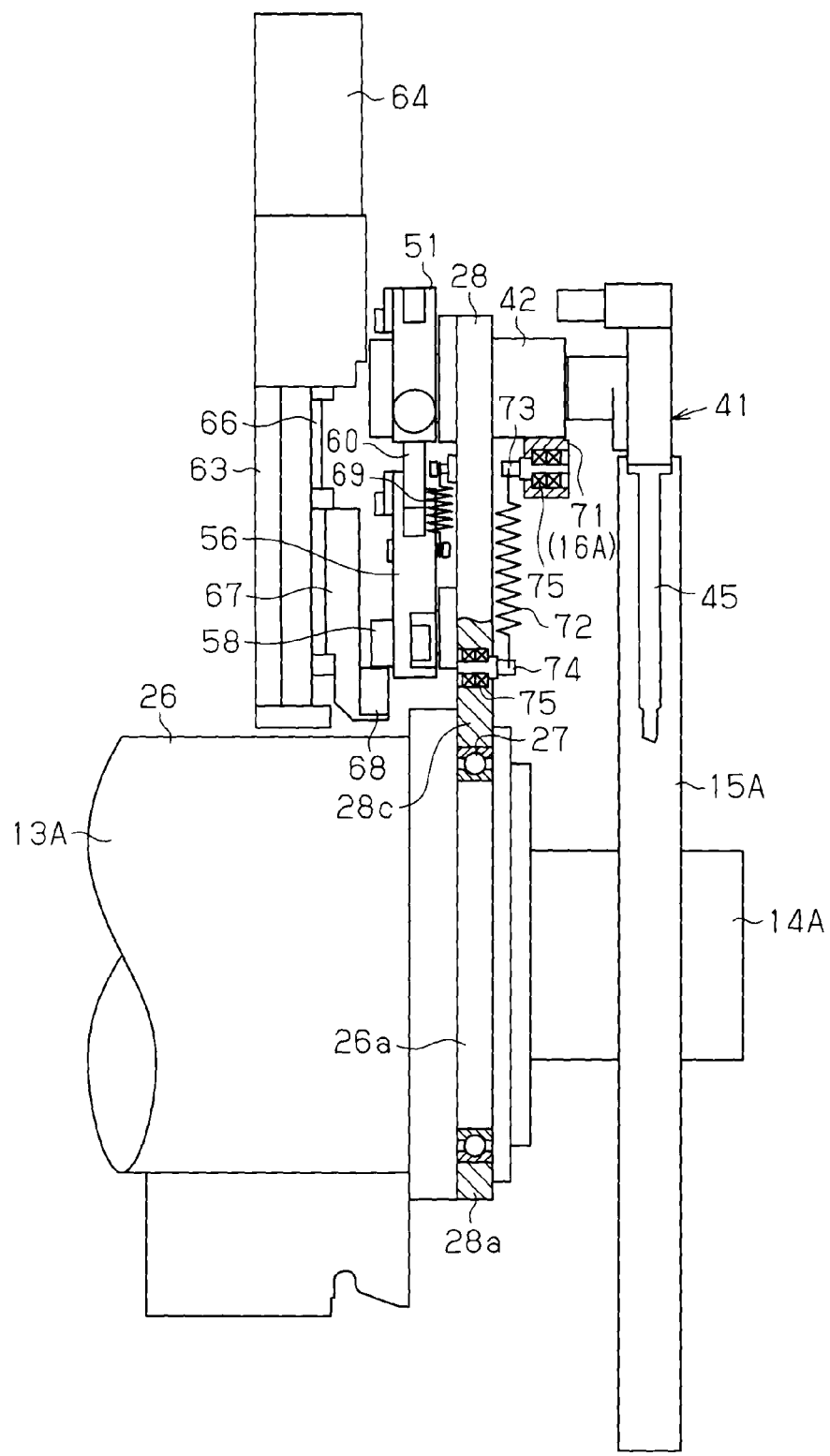
FIG. 4 is an enlarged front view illustrating a measuring device and a measurement position adjusting mechanism.

As shown in FIGS. 1 and 4, the grinding head 13A has a motor housing 26. The motor housing 26 includes a cylindrical boss 26a. The boss 26a serves as a support portion that supports the rotary shaft 14A. A tilt arm 28 is supported at the outer circumferential surface of the boss 26a. Specifically, the tilt arm 28 has a ring portion 28a serving as a proximal attachment portion, and is attached to the boss 26a at the ring portion 28a with a bearing 27, so as to be vertically tiltable. A bent portion 28c is provided at the proximal portion of the tilt arm 28. The tilt center 028 of the tilt arm 28 is located on the same axis (Z-axis) as the rotation center 015 of the first grindstone 15A.

A position switching mechanism 30 will now be described. A measuring device 41, which will be discussed below, is attached to the distal end of the tilt arm 28 to be rotatable about an axis that is parallel to an axis through the center 028 (015) of the tilt arm 28. The position switching mechanism 30 tilts the tilt arm 28 to switch the measuring device 41 between a home position Po and a measurement position Ps. The measuring device 41 forms measuring means for measuring the outer diameter of the crankpin 23a.

As shown in FIGS. 1 and 3, a protrusion 28d is integrally formed with the outer circumferential surface of the ring portion 28a of the tilt arm 28. A roller 32 is rotatably supported by the protrusion 28d with a support shaft 31.

Figure 13:
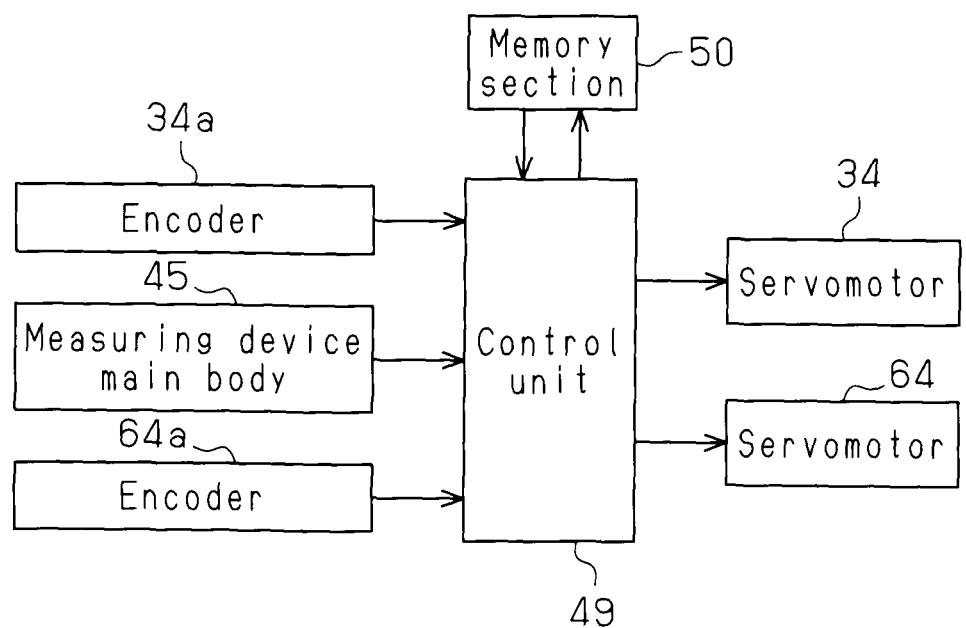
FIG. 13 is a block diagram showing the electric constitution of the two-head type grinding machine.

As shown in FIG. 2, an attachment frame 33 is attached to a side of the cover 16A of the first grindstone 15A. As shown in FIGS. 1 and 13, a servomotor 34 is fixed to the upper end of the attachment frame 33. The servomotor 34 includes an encoder 34a and serves as a first motor that forms drive means and angle adjusting means for the tilt arm 28. The servomotor 34 is rotatable both in forward and reverse directions. The rotary shaft of the servomotor 34 is coupled to a ball screw 36 with a joint 35. A slider 37 is attached to the attachment frame 33 to be reciprocated vertically. A ball screw nut (not shown), which is threaded to the ball screw 36, is attached to the slider 37. The slider 37 has an actuating element 38, which selectively contacts and separates from the roller 32. When the ball screw 36 is rotated by the servomotor 34, and the slider 37 and the actuating element 38 are lowered, the actuating element 38 pushes the roller 32 down, so that the tilt arm 28 is tilted clockwise as viewed in FIGS. 1 and 3. In contrast, when the actuating element 38 is raised, the tilt arm 28 and the measuring device 41 are tilted counterclockwise as viewed in FIGS. 1 and 3 by their own weight and the force of a spring 72, which will be discussed below. The tilt arm 28, the measuring device 41, and the spring 72 form urging means, which functions as the angle adjusting means.

Next, the measuring device 41 and its related configuration will be described. The measuring device 41 is used for measuring the outer diameter of a crankpin 23a of the crankshaft 23.

As shown in FIGS. 5 and 6(a), the tilt arm 28 has a receiving hole 28e at the distal end. A bearing cylinder 42 with a flange 42a is received in the receiving hole 28e. The flange 42a is fixed to the tilt arm 28 with a bolt. An inner cylinder 43 is supported on the inner circumferential surface of the bearing cylinder 42 with a bearing. A rotary shaft 44 is supported on the inner circumferential surface of the inner cylinder 43 with a bearing to be rotatable about an axis along the direction of Z-axis. A flange 44a is integrally formed at one end of the rotary shaft 44. A measuring device 41 is coupled to the flange 44a. As shown in FIG. 1, the measuring device 41 includes a main body 45 coupled to the flange 44a, a gauge 46 coupled to the lower end of the main body 45, and a measuring pin 47 attached to the main body 45. The gauge 46 has a substantially V-shaped engagement recess 46a. The measuring pin 47 contacts the outer circumferential surface of a crankpin 23a.

Next, a structure for adjusting the measuring posture of the measuring device 41 will be described. This structure rotates the measuring device 41 about the center axis 044 of the rotary shaft 44 in accordance with changes in the outer diameter of the crankpin 23a.

As shown in FIGS. 5 and 6, a driven lever 51 is integrally formed with an end of the inner cylinder 43. A shaft hole 51a is formed in the proximal portion of the driven lever 51. In the shaft hole 51a, a sleeve 48 is fitted about the outer circumferential surface of the rotary shaft 44. Keyways 44b, 48a are formed in the rotary shaft 44 and the sleeve 48, respectively.

A key 52 is engaged with the keyways 44b, 48a, which prevents the rotary shaft 44 and the sleeve 48 from rotating relatively to each other.

An accommodating recess 51b is formed in a lower portion of the shaft hole 51a of the driven lever 51. An actuating projection 48b is integrally formed on the outer circumferential surface of the sleeve 48. The actuating projection 48b is received in the accommodating recess 51b with a predetermined clearance. A pair of threaded holes 51c is formed in the proximal portion of the driven lever 51 to correspond to the accommodating recess 51b. A plunger 53A is threaded to each threaded holes 51c. The plungers 53A each have a spring 53B and a ball 53C, which is held by the spring 53B. The balls 53C of the plungers 53A tightly hold the actuating projection 48b. As shown in FIG. 6(b), each plunger 53A is locked at a predetermined position by a locking screw 53D. The plungers 53A and the actuating projection 48b form holding means, which always holds the measuring device 41 at a neutral position, and allows the measuring device 41 to be rotated from the neutral position by an external force.

When no or small external force in the rotating direction is acting on the measuring device 41, the actuating projection 48b of the sleeve 48 is held at the center of the accommodating recess 51b. When the measuring device 41 receives an external force of arrows in FIG. 6(a), that is, a force either in a clockwise direction or a counterclockwise direction, the balls 53C are moved against the force of the springs 53B. Accordingly, the measuring device 41 is allowed to swing in the directions of arrows in FIG. 6.

A tilting mechanism for tilting the driven lever 51 will now be described.

Figure 7:
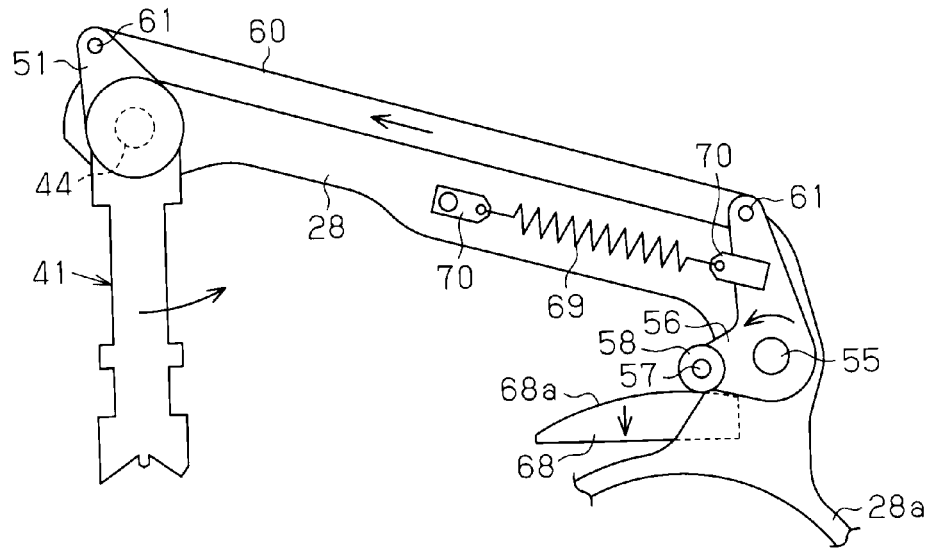
FIG. 7 is a right side view illustrating the measurement position adjusting mechanism of the measuring device.

As shown in FIGS. 3 and 7, the bent portion 28c of the tilt arm 28 rotatably supports a drive lever 56 serving as a first driven lever with a support shaft 55. A roller 58 is supported at an end of the drive lever 56 with a shaft 57. A link 60 is coupled to the other end of the drive lever 56 and the driven lever 51 serving as a second driven lever with a coupler pin 61.

The roller 58 is lifted and lowered by a lift mechanism described below. As shown in FIGS. 2 and 3, a fixed support plate 62 is provided at a predetermined position. An attachment frame 63 is attached to a side of the fixed support plate 62. A servomotor 64 is fixed to the upper end of the attachment frame 63. The servomotor 64 includes an encoder 64a and serves as a second motor rotatable both in forward and reverse directions. The rotary shaft of the servomotor 64 is coupled to a ball screw 66 with a joint 65. A slider 67 is attached to the attachment frame 63 to be moved vertically. A ball screw nut (not shown), which is threaded to the ball screw 66, is attached to the slider 67. An actuating element 68 is attached to the slider 67. The actuating element 68 contacts the roller 58 from below. The servomotor 64 and the actuating element 68 form adjusting means that adjusts the rotation angle of the measuring device 41.

A first spring 69 is hooked between the tilt arm 28 and the drive lever 56 with hooks 70 as shown in FIGS. 3 and 7 (the drive lever 56 and the link 60 are visible in FIG. 7). The first spring 69 is a coil spring serving as an urging member. The first spring 69 always urges the drive lever 56 in the counterclockwise direction, so that the roller 58 at the distal end of the drive lever 56 engages with an arcuate surface 68a on the actuating element 68. The arcuate surface 68a is formed to conform to an arc the center of which coincides with the tilt center 028 of the tilt arm 28.

In this state, when the servomotor 64 shown in FIG. 3 rotates the ball screw 66, and the slider 67 and the actuating element 68 are moved upward, the drive lever 56 is tilted clockwise as viewed in FIGS. 3 and 7 against the urging force of the first spring 69 due to the engagement between the actuating element 68 and the roller 58. Accordingly, the driven lever 51 is rotated clockwise through the link 60, and the measuring device 41 is rotated in the same direction and separated away from the first grindstone 15A. When the servomotor 64 rotates to lower the slider 67 and the actuating element 68, the accumulated force of the first spring 69 rotates the drive lever 56 counterclockwise. Accordingly, the measuring device 41 approaches the first grindstone 15A.

When grinding of a crankpin 23a of the crankshaft 23 has been performed for a predetermined period and the diameter of the first grindstone 15A is reduced due to abrasion, the grinding position of the crankpin 23a is changed accordingly. In this case, the grindstone 15A is advanced by the amount corresponding to the reduction in the diameter, and the measurement position of the measuring device 41 can be adjusted. However, it is burdensome to frequently adjust the measuring device 41 by activating the servomotor 64 with control signals from a control unit 49 shown in FIG. 13. According to the present invention, the adjustment is executed by the above described configuration shown in FIGS. 6(a) and 6(b).

That is, when the position of the crankpin 23a is changed due to a reduction in the diameter of the first grindstone 15A, an external force about the center axis 044 acts on the gauge 46 of the measuring device 41. At this time, the measuring device main body 45 is rotated about the rotary shaft 44 by a minute angle range against the force of the spring 53B of the plunger 53A. Therefore, for example, even if the diameter of the first grindstone 15A is decreased and the grinding position of the crankpin 23a of the crankshaft 23 is changed, the measuring device 41 is rotated about the rotary shaft 44 against the urging force of the spring 53B such that the gauge 46 of the measuring device 41 is located at an appropriate position (position of gauge application) with respect to the outer circumferential surface of the displaced crankpin 23a.

Next, a tilt operation stabilizing mechanism K3 for allowing the tilt arm 28 to be smoothly tilted will be described.

Figure 8:
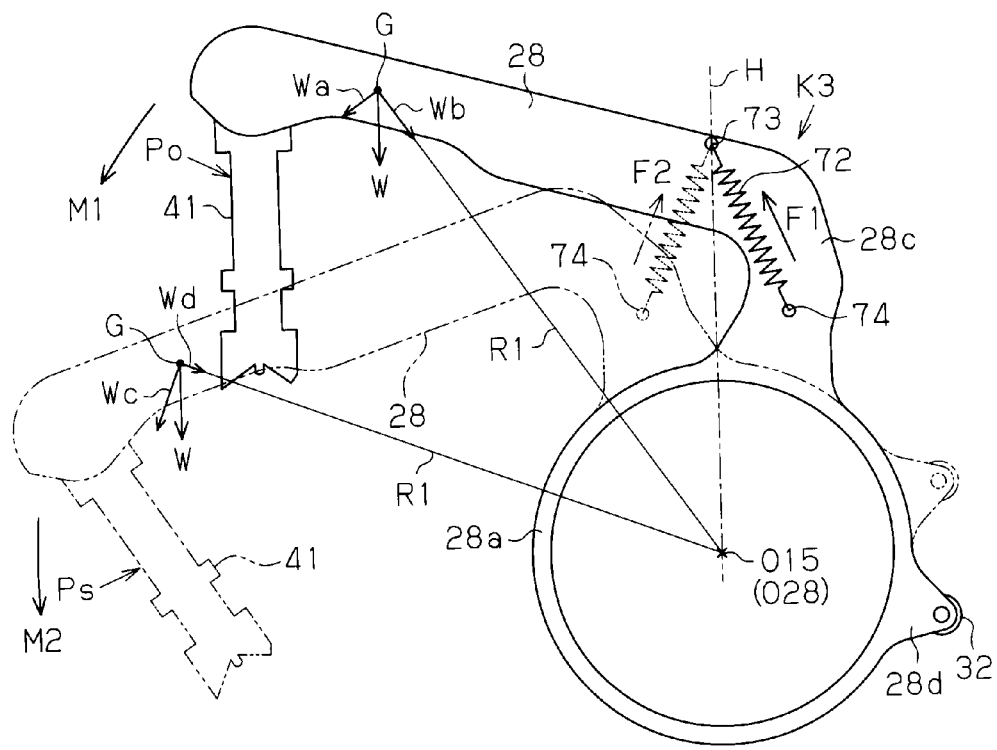
FIG. 8 is a right side view illustrating a mechanism for stabilizing operation of the tilt arm.

As shown in FIGS. 4 and 8, a second spring 72 is hooked between a fixed frame 71 (or the cover 16A) and the bent portion 28c of the tilt arm 28 with first and second hook pins 73, 74. The second spring 72 is a coil spring that serves as urging means. The first and second hook pins 73, 74 are rotatably supported by the fixed frame 71 and the bent portion 28c with bearings 75. When the second hook pin 74 is on a straight line H connecting the first hook pin 73 and the tilt center 028 of the tilt arm 28 (the rotation center 015 of the grindstone 15A), the second spring 72 is at the dead point, so that the moment due to the force of the second spring 72 becomes zero. The second spring 72 serves as reducing means that reduces the load caused by the weight of the tilt arm 28 and the measuring device 41.

When the measuring device 41 is lifted and located at the home position Po, which is away from the first grindstone 15A by a predetermined distance, and the tilt arm 28 is tilted upward, the second hook pin 74 is located behind the straight line H as illustrated by a solid line in FIG. 8. In this state, the second spring 72 is stretched to accumulate force. The accumulated force F1 urges the tilt arm 28 in the counterclockwise direction as viewed in FIG. 8. Further, the tilt arm 28 receives a rotation moment M1 in the counterclockwise direction due to its own weight. The rotation moment M1 is expressed as shown below. That is, when the self weight acting on the center of gravity of the tilt arm 28 and the measuring device 41 is expressed by W, the rotation radius from the rotation center 015 to the center of gravity G is expressed by R1, and components of the self weight W in a direction of a tangent through the center of gravity G and in a radial direction are expressed by Wa, Wb, respectively, the rotation moment M1 is expressed by the following equation.

$$M1 = Wa \times R1$$

Therefore, in the state indicated by the solid lines of FIG. 8, the tilt arm 28 receives the sum of the accumulated force F1 and the rotation moment M1.

In contrast, when the crankpin 23a is rotated downward and the tilt arm 28 is tilted counterclockwise, the second hook pin 74 is moved to a position forward of the straight line H as shown by the lines having a long dash alternating with two short dashes, so that the second spring 72 is expanded and the accumulated force F2 is applied to the tilt arm 28. In this state, the tilt arm 28 and the measuring device 41 receive a counterclockwise rotation moment M2. When the self weight acting on the center of gravity G of the tilt arm 28 and the measuring device 41 is expressed by W, the rotation radius from the rotation center 015 to the center of gravity G is expressed by R1, and components of the self weight W in a direction of a tangent through the center of gravity G and in a radial direction are expressed by Wc, Wd, respectively, the rotation moment M2 is expressed by the following equation.

$$M2 = Wc \times R1$$

Since Wa<Wc, the rotation moment M2 is greater than the rotation moment M1. However, since the accumulated force F2 of the second spring 72 urges the tilt arm 28 clockwise, the increased rotation moment M2 is cancelled. Therefore, in the state of the line of a long dash alternating with two short dashes of FIG. 8, the tilt arm 28 receives the difference between the accumulated force F2 and the rotation moment M2. The rotation moment M2 is greater than the accumulated force F2. Therefore, after the second hook pin 74 has moved leftward to pass the straight line H as viewed in FIG. 8, the load caused by the weight of the tilt arm 28 and the measuring device 41 is reduced. At this time, the tilt arm 28 and the measuring device 41 can be stably tilted in a reciprocating manner by a small force.

As shown in FIGS. 1 and 3, the covers 16A, 16B each have a feed nozzle 77 for feeding coolant to the crankpin 23a when the first and second grindstones 15A, 15B are grinding crankpins 23a. The feed nozzles 77 are located either at an operative position shown in FIG. 1 (where the nozzles 77 are near a part being ground and feed coolant to the part) and a retreat position (where the feed nozzles 77 are off the paths of the tilt arms 28 and the measuring devices 41). As shown in FIG. 2, a dressing mechanism 79 having a disk-like dresser 78 is arranged in the vicinity of the main spindle device 19A. The dresser 78 is used for dressing the outer circumferential surfaces of the first grindstone 15A and the second grindstone 15B.

Figure 12:
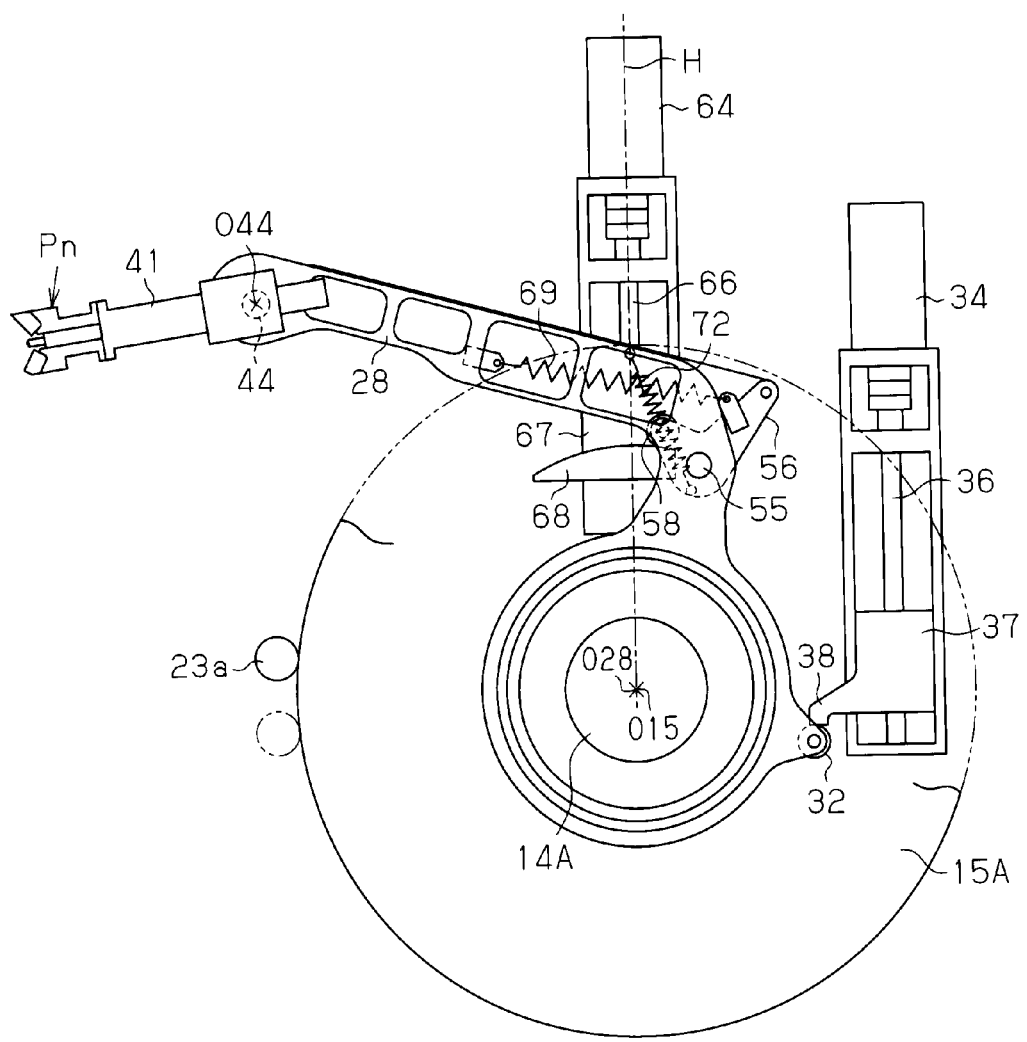
FIG. 12 is a right side view illustrating a non-measuring state of the outer diameter of the crankpin, where the measuring device has been reversed to a non-contacting position.

In the present embodiment, a reversing mechanism for reversing the measuring device 41 is provided. When the first and second grindstones 15A, 15B are dressed with the dressing mechanism 79, the measuring device 41 is rotated by a predetermined angle, and moved from the home position Po shown in FIG. 9 to a non-contacting position Pn where the measuring device 41 does not contact the dressing mechanism 79 as shown in FIG. 12.

A memory section 50 shown in FIG. 13 stores machining program and various data such as temporal data generated during machining.

Operation of the thus configured grinding machine will now be described.

In the state of FIG. 1, the first and second movable bodies 11A, 11B are at the original positions. That is, as shown in FIG. 2, the first movable body 11A is located on the left side of the base frame 10, and the second movable body 11B is located on the right side of the base frame 10, as viewed from the side of the crankshaft 23. The first and second grinding bases 12A, 12B are at the retreat ends (original positions) in the X-axis direction. In this state, the crankshaft 23 held by the main spindle devices 19A, 19B is stopped, and the first and second grindstones 15A, 15B are rotated. The measuring devices 41 are held at the home position Po shown in FIG. 9, and the feed nozzles 77 are held at positions in the vicinity of the machining positions. In the following description of the rough-grinding of crankpins 23a, the diameters of the crankpins 23a are not measured with the measuring devices 41. The measurement is carried out during the finish-grinding.

When crankpins 23a are subjected to rough-grinding in the state shown in FIG. 1, the crankshaft 23 held between the main spindle devices 19A and 19B is rotated about the journal 23b based on a control signal from the control unit 49. At the same time, the grindstones 15A, 15B are rotated, and the first and second grinding bases 12A, 12B are reciprocated along the X-axis direction as the crankpins 23a orbit. In this manner, two of the crankpins 23a of the crankshaft 23 are simultaneously rough-ground by the first and second grindstones 15A, 15B, respectively.

In this rough-grinding of the crankpins 23a, the servomotor 64 is activated to lower the slider 67 and the actuating element 68. Then, the accumulated force of the first spring 69 moves the roller 58 downward while contacting the arcuate surface 68a of the actuating element 68. Accordingly, the drive lever 56 is rotated counterclockwise about the support shaft 55. The rotation causes the measuring devices 41 to rotate counterclockwise about the rotary shaft 44 from the home position Po via members such as the link 60 and the driven lever 51 as shown by the lines of a long dash alternating with two short dashes in FIG. 9, so that the gauge 46 and the measuring pin 47 of the measuring device 41 are moved to a position Pg where these contact the outer circumferential surface of the grindstones 15A, 15B.

Figure 9:
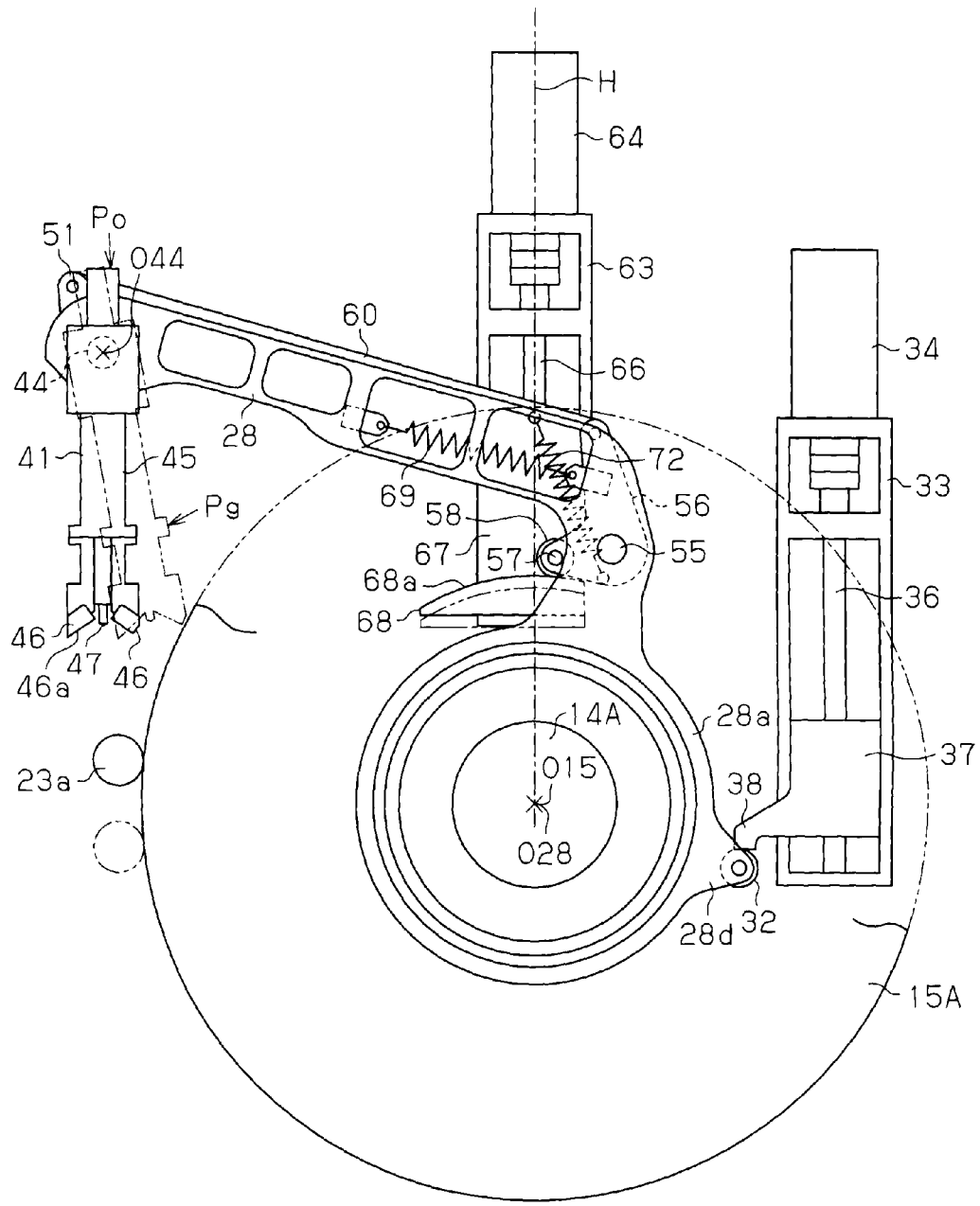
FIG. 9 is a right side view illustrating a non-measuring state of the outer diameter of a crankpin.
Figure 10:
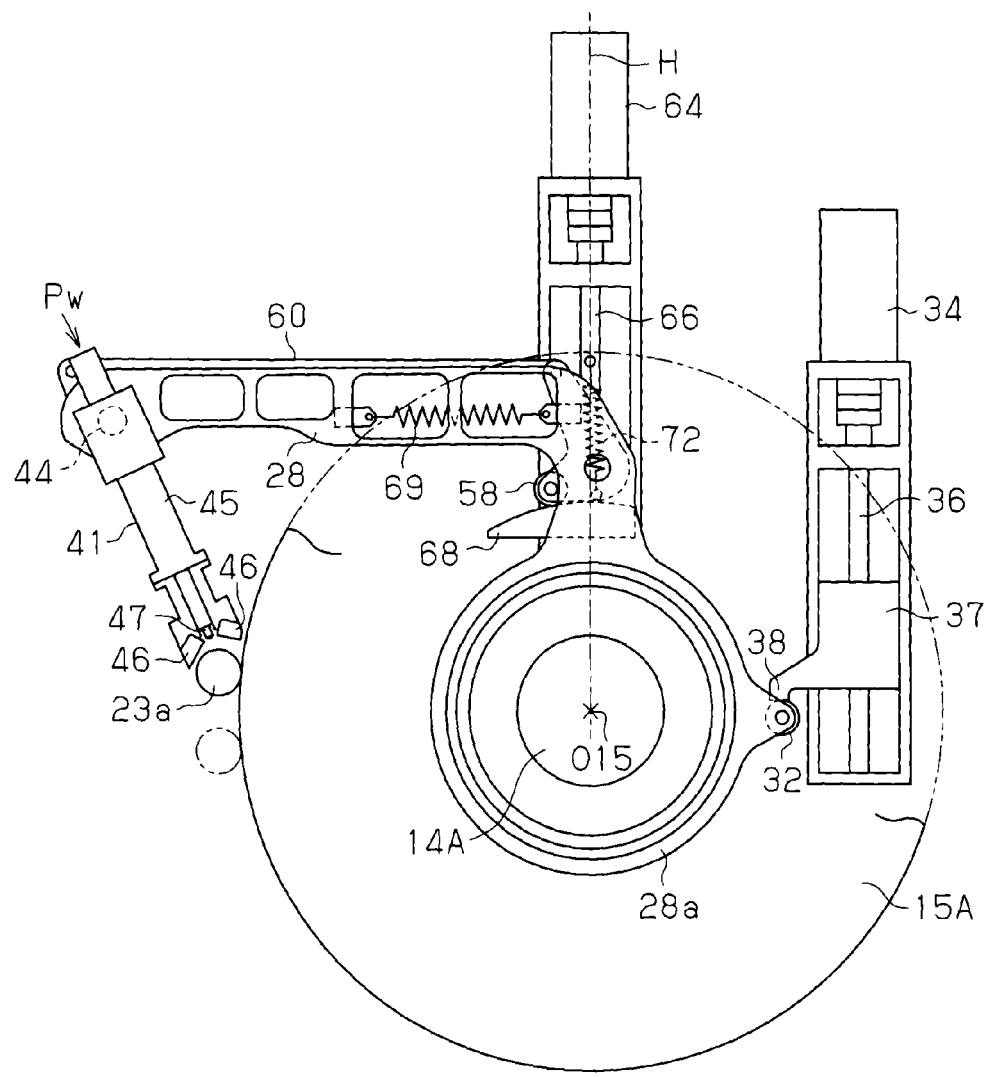
FIG. 10 is a right side view illustrating a non-measuring state of the outer diameter of a crankpin.

During the rough-grinding shown in FIG. 9, the servomotor 34 of the position switching mechanism 30 is activated, so that the slider 37 and the actuating element 38 are moved upward. Then, the tilt arm 28 and the measuring device 41 are tilted counterclockwise about the tilt center 028 (the rotation center 015 of the grindstone 15A) along a path of an arc of a true circle, so that the measuring device 41 is moved toward a crankpin 23a of the crankshaft 23. The gauge 46 and the measuring pin 47 of the measuring device 41 are stopped at a position immediately before contacting the outer circumferential surface of the crankpin 23a, or at a standby position Pw shown in FIG. 10. The standby position Pw is suitably set in accordance with the type of the crankshaft 23.

After the rough-grinding is over, finish-grinding is started. The finish-grinding is performed by reducing only the feed rate of the crankshaft 23 so that the grinding rate per unit time is reduced. Thus, the grinding of the crankpin 23a is not stopped, but shifted from the rough-grinding to the finish-grinding.

Figure 11:
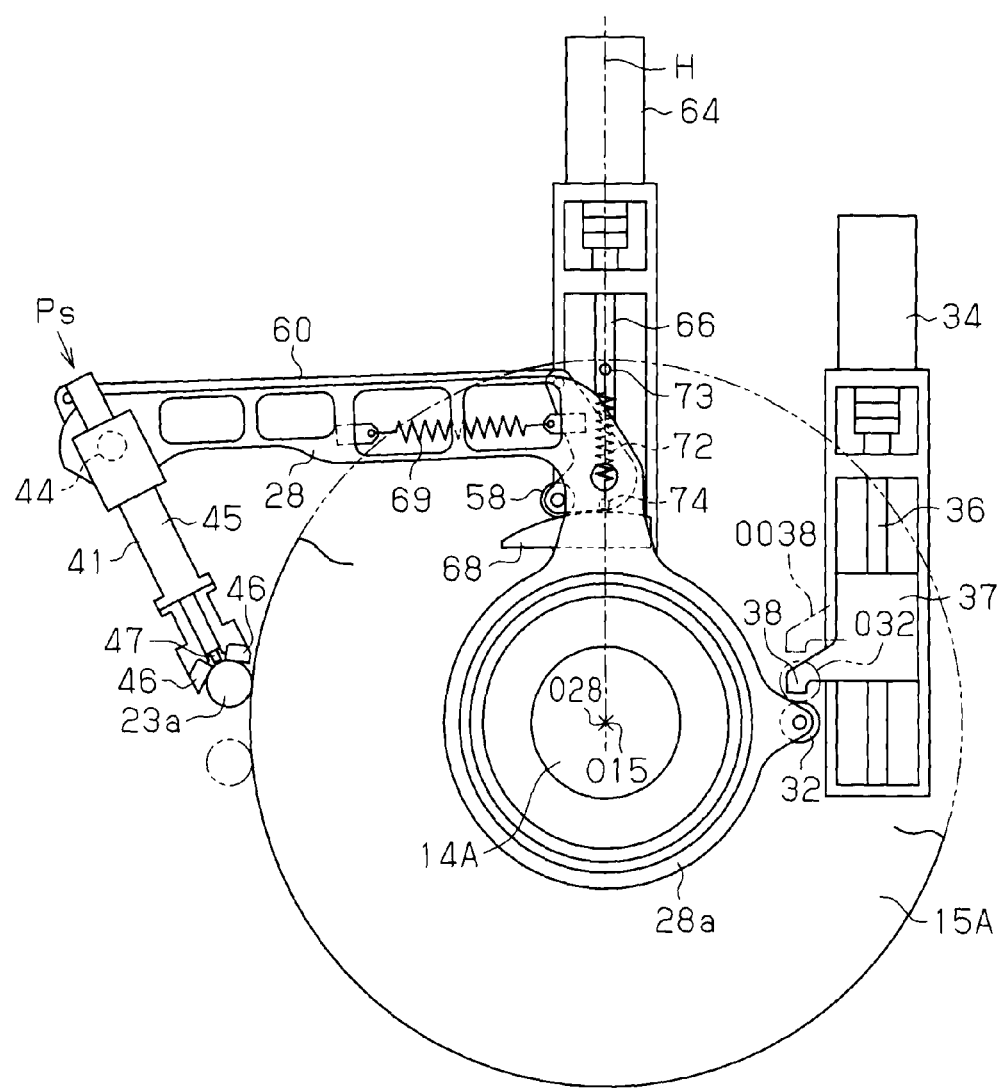
FIG. 11 is a right side view illustrating a measuring state of the outer diameter of the crankpin.

At this time, the servomotor 34 is activated so that the slider 37 and the actuating element 38 are moved upward. Accordingly, the tilt arm 28 is lowered, and the gauge 46 and the measuring pin 47 of the measuring device 41 contact the outer circumferential surface of the crankpin 23a. Then, as shown in FIG. 11, the slider 37 and the actuating element 38 are stopped at a position (position 0038 of a line of a long dash alternating with two short dashes) over the upper limit of the movement of the roller 32 (position 0032 of a line of a long dash alternating with two short dashes). The servomotor 64 is activated to move the slider 67 and the actuating element 68 downward again, so that the actuating element 68 is separated from the roller 58. In this state, the crankpin 23a is subjected to the finish-grinding.

During the finish-grinding of the crankpin 23a, the tilt arm 28 and the measuring device 41 are urged counterclockwise about the tilt center 028 by the self weight as shown in FIG. 11. Accordingly, the gauge 46 of the measuring device 41 is kept contacting the outer circumferential surface of the crankpin 23a. In this state, the measuring pin 47 of the measuring device 41 measures the outer diameter of the crankpin 23a.

In this case, the measurement data of the outer diameter of the crankpin 23a measured by the measuring device 41 is sent to the control unit 49. The control unit 49 determines whether the outer diameter of the crankpin 23a has reached the outer diameter of a target value. When determining that the measurement value reaches the target value, the control unit 49 outputs a signal for stopping the grinding of the crankpin 23a, so that the servomotors 34, 64 are activated. The tilt arm 28 and the measuring device 41 are moved from the measurement position Ps shown in FIG. 11 to a position Pg shown by the line of a long dash alternating with two short dashes in FIG. 9. Thereafter, as shown in FIG. 3, the first and second grinding bases 12A, 12B are retreated and the rotation of the crankshaft 23 is stopped. Then, the measuring device 41 is moved to the home position Po shown by the solid line in FIGS. 9 and 3.

Subsequently, the first and second movable bodies 11A, 11B are moved to positions where they face two crankpins 23a that have not been ground, and the above described procedure is repeated to subject these crankpins 23a to the rough-grinding and the finish-grinding. When all the crankpins 23a in the crankshaft 23 are ground, grinding to the crankpins 23a of a subsequent crankshaft 23 is consecutively started.

When grinding of crankshafts 23 is continued for an extended period and the grinding performance of the outer circumferential surface of the first and second grindstones 15A, 15B is lowered, the first and second grindstones 15A, 15B are dressed with the dressing mechanism 79. In this case, after the feed nozzles 77 are moved to a retreat position to avoid contact with the dressing mechanism 79, the actuating elements 68 are greatly raised by the servomotors 64 as shown by the solid line in FIG. 12, so that the measuring devices 41 at the home position Po are moved to the non-contact position Pn. In this state, the first grinding base 12A or the second grinding base 12B is moved along the X-axis and Z-axis, so that the first grindstone 15A or the second grindstone 15B contacts the dresser 78 of the dressing mechanism 79, so that the dressing of the grindstone 15A or 15B is performed.

The grinding machine of the above embodiment has the following advantages.

In the above embodiment, the tilt center 028 of the tilt arm 28 and the rotation center 015 of the grindstones 15A, 15B are aligned on the same straight line. Thus, after the measuring device 41 supported by the tilt arm 28 is moved from the home position Po to the position Pg, the path of the measuring device 41 from the position Pg to the measurement position Ps via the standby position Pw matches with an arc coaxial with the arc of the outer circumference of the grindstones 15A, 15B. Thus, even if the tilt arm 28 is tilted, the distance between the gauge 46 of the measuring device 41 and the outer circumferential surface of the grindstones 15A, 15B is maintained constant. Therefore, the position of the gauge 46 relative to the crankpin 23a can be easily adjusted without performing complicated computations. Thus, even if the crankpin 23a is orbiting when the rough-grinding is shifted to the finish-grinding, the measuring device 41 can be smoothly set on the crankpin 23a. That is, the gauge application is smoothly and accurately performed. The impact at the gauge application is reduced, and the measuring device 41 operates accurately.

Further, since the gauge 46 can be moved along the outer circumferential surface of the grindstones 15A, 15B about the center of the grindstones 15A, 15B as described above. The guide member 122 of the conventional gauge 121 described in the BACKGROUND ART section may be omitted. Therefore, by activating the servomotor 34, the standby position Pw of the gauge 46 of the measuring device 41 can be set to a position above and in the vicinity of the crankpin 23a of the crankshaft 23. Thus, the measuring device 41 can be moved from the home position Po to the standby position Pw during the rough-grinding. Also, switching of the measuring device 41 from the standby position Pw to the measurement position Ps and the reverse switching, that is, the gauge application and gauge disengagement can be quickly performed in a short distance even if the type of the crankshaft 23 varies. Accordingly, the outer diameter of the crankpin 23a can be quickly measured, and the impact due to the gauge application is reduced. Further, the standby position Pw is adjusted according to the type of the crankshaft 23 so as to reduce the distance between the standby position Pw and the measurement position Ps. Therefore, as described above, during the finish-grinding of crankpins 23a, the impact at the gauge application is reduced, and the measuring device 41 operates accurately. Accordingly, the guide member 122 of the conventional gauge 121 can be omitted.

In the above embodiment, prior to the dressing of the grindstone 15A or 15B by the dressing mechanism 79, the measuring device 41 is moved from the home position Po, which is shown by a solid line in FIG. 9, to the non-contact position Pn shown in FIG. 12. The measuring device 41 is thus easily switched to a position where it does not contact the dressing mechanism 79.

In the above embodiment, as shown in FIGS. 4 and 8, one end of the second spring 72 is hooked to the first hook pin 73 supported by the cover 16A, and the other end of the second spring 72 is hooked to the second hook pin 74 coupled to the bent portion 28c of the tilt arm 28. When the measuring device 41 is at the home position Po, the second hook pin 74 is displaced from the straight line H connecting the first hook pin 73 and the rotation center 015 of the grindstones 15A, 15B. The second spring 72 is expanded, and the accumulated force F1 in the downward tilting direction acts on the tilt arm 28. Thus, when the tilt arm 28 is tilted counterclockwise to move the measuring device 41 from the home position Po to the standby position Pw, the operation can by performed smoothly by using the accumulated force F1.

When the tilt arm 28 is tilted counterclockwise as the crankpin 23a is moved downward, the second hook pin 74 is moved to a position forward of the straight line H as shown by the line of a long dash alternating with two short dashes in FIG. 8, so that the second spring 72 is expanded and the accumulated force F2 in the upper tilting direction is applied to the tilt arm 28. Therefore, in FIG. 11, when the tilt arm 28 is reciprocated vertically as the crankpin 23a is rotated during the grinding of the crankpin 23a, the weight of the tilt arm 28 is canceled by the accumulated force F2 (tensile force) of the second spring 72, so that the tilt arm 28 is reciprocated smoothly.

In the above embodiment, the measuring device 41 is rotatably attached to the distal end of the tilt arm 28. The measuring device 41 can be reciprocated within a predetermined angular range by a swing mechanism K2, and always held at a neutral position by the spring 53B of the plunger 53A. Thus, even if the position of the crankpin 23a in the X-axis direction is slightly changed due to a reduction in the diameter of the first and second grindstones 15A, 15B, the measuring device 41 can be moved against the force of the spring 53B of the plunger 53A. This allows the gauge 46 of the measuring device 41 to follow the displacement of the crankpin 23a. Therefore, when the diameter of the grindstones 15A, 15B is reduced, the position of the measuring device 41 can be adjusted by a simple structure.

Second Embodiment

Figure 14:
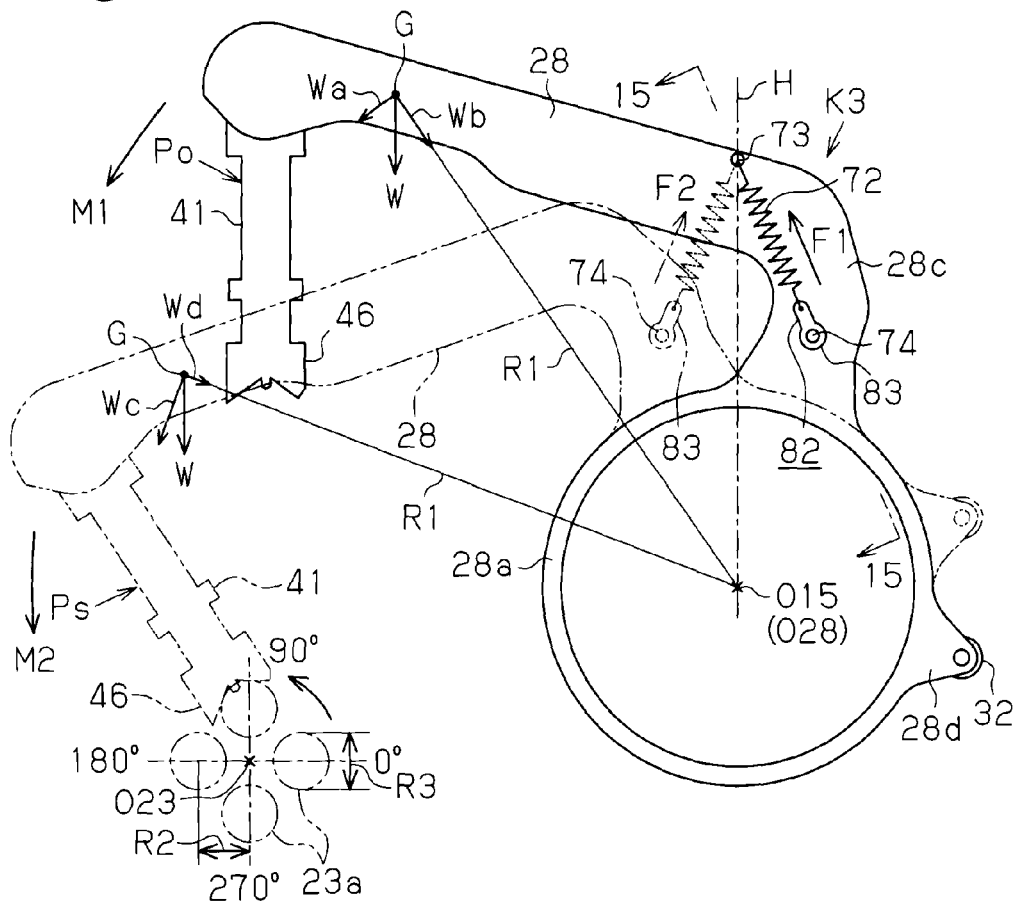
FIG. 14 is a diagrammatic right side view illustrating a grinding machine according to a second embodiment of the present invention.
Figure 15:
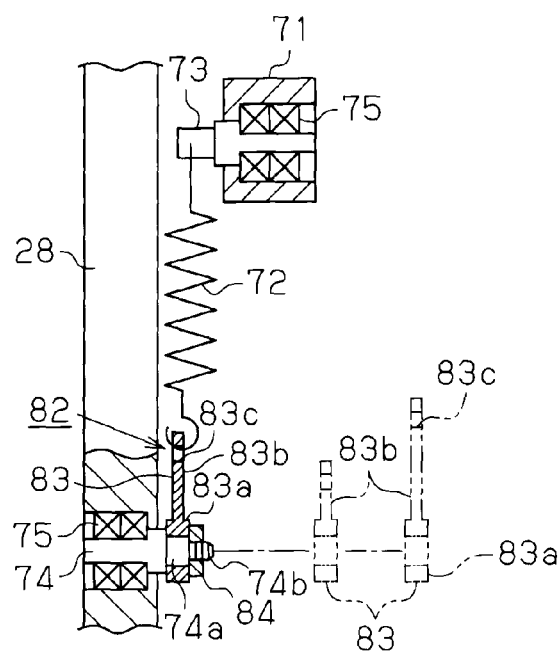
FIG. 15 is a cross-sectional view taken along line 15-15 of FIG. 14.
Figure 16:
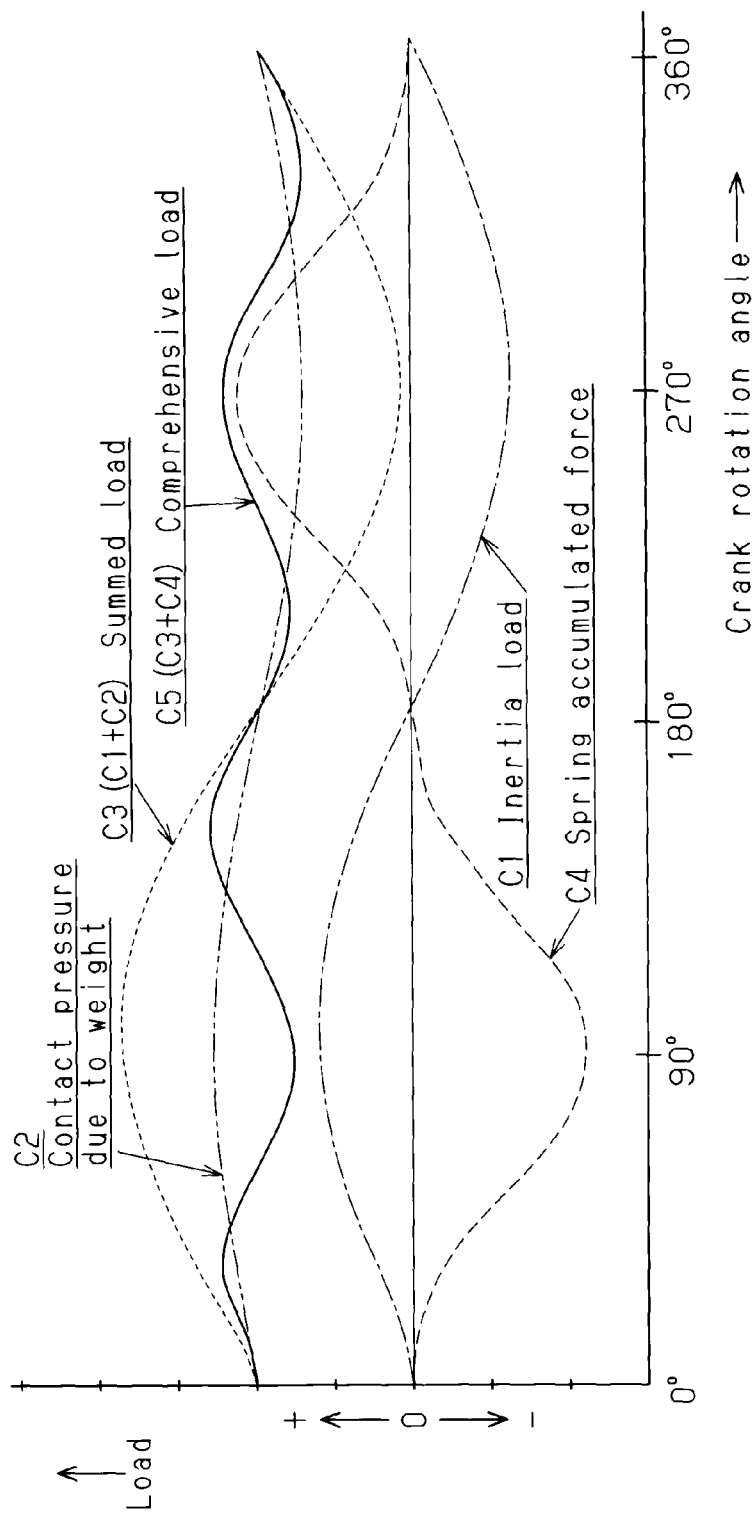
FIG. 16 is a graph showing loads acting on contacting parts of the crankpin and the measuring device when the crankpin is rotated in the grinding machine.
Figure 17:
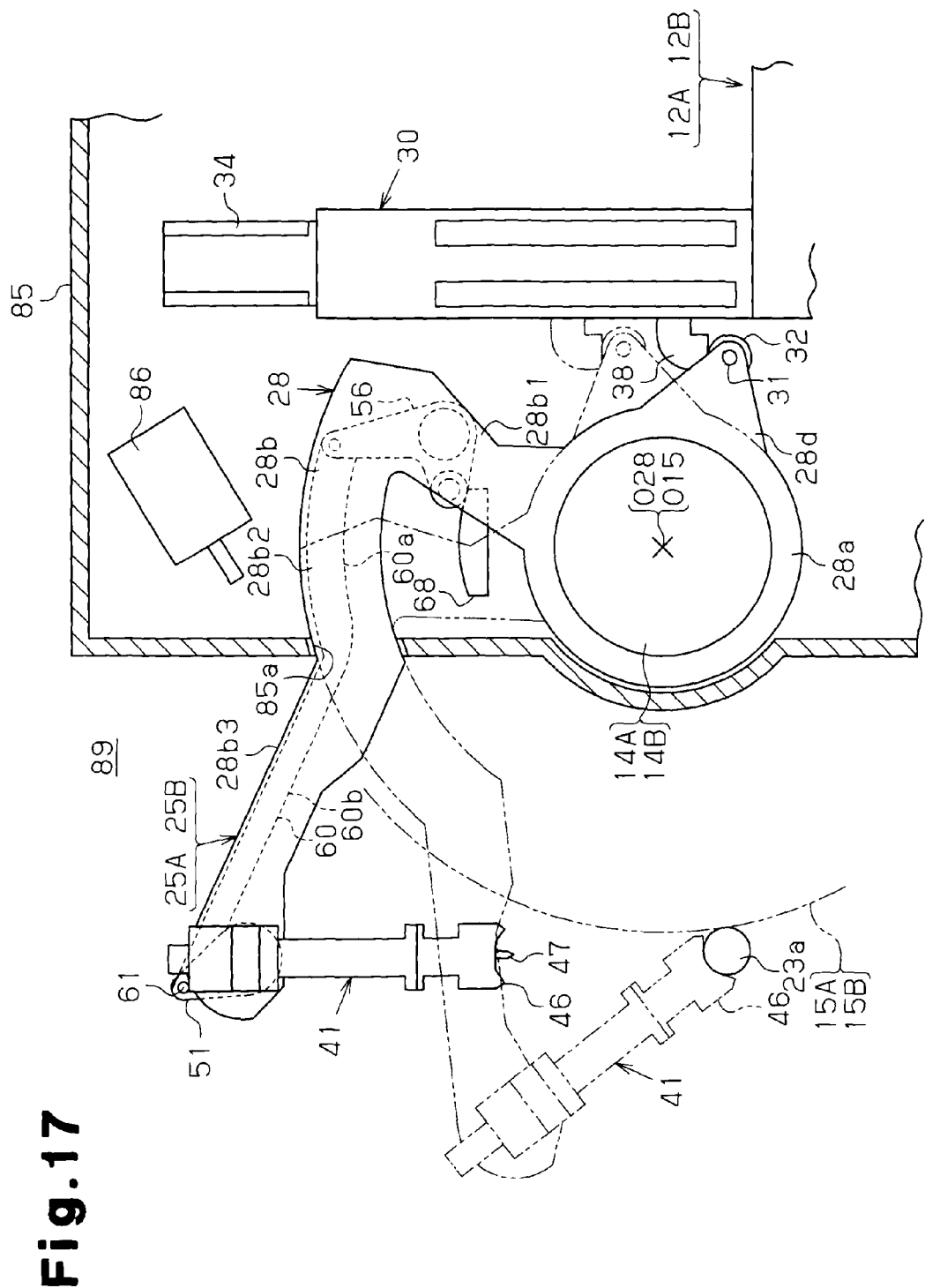
FIG. 17 is a diagrammatic right side view illustrating a grinding machine according to a third embodiment of the present invention.

With reference to FIGS. 14 to 16, a grinding machine according to a second embodiment of the present invention will be described.

In the grinding machine of the present embodiment, the second spring 72, which applies the accumulated forces F1, F2 to the tilt arm 28, has an accumulated force adjusting mechanism 82, which serves as load adjusting means for adjusting the accumulated forces F1, F2. That is, as shown in FIGS. 14 and 15, the second hook pin 74, which is rotatably supported by the tilt arm 28 with the bearing 75, has at its distal end a fitting shaft 74a and a screw 74b. A hook member 83 is detachably fitted to the fitting shaft 74a of the second hook pin 74 at a proximal ring portion 83a. A nut 84 is threaded onto the screw 74b of the second hook pin 74 to fasten the hook member 83 to the second hook pin 74.

A hook piece 83b having a predetermined length projects from the outer circumference of the ring portion 83a of the hook member 83. A hook hole 83c is formed in the distal end of the hook piece 83b to receive the lower end of the second spring 72. In the present embodiment, several hook members 83 with hook pieces 83b of different lengths are prepared as shown by the lines of a long dash alternating with two short dashes in FIG. 15. One of the prepared hook members 83 is selected and attached to the measuring apparatuses 25A, 25B, and the second spring 72 is received in the hook hole 83c. This changes the expansion amount of the second spring 72 and adjusts the accumulated forces F1, F2. As a result, the reduction in the load due to the weight of the tilt arm 28 is adjusted.

That is, in the finish-grinding of the crankpin 23a, when the outer diameter of the crankpin 23a is measured with the gauge 46 and the measuring pin 47 of the measuring device 41 contacting the crankpin 23a, rotation of the crankpin 23a about the center 023 causes the load acting on the contacting parts of the measuring device 41 and the crankpin 23a to change as shown in FIG. 16. That is, as the rotation angle of the crankpin 23a changes to 0 degrees, 90 degrees, 180 degrees, and 270 degrees as shown in FIG. 14, the rotation of the crankpin 23a changes the inertia load acting on the contacting parts as shown by characteristic curve C1 of FIG. 16. Also, the contact pressure acting on the contacting parts due to the weight of the measuring device 41 changes as shown by characteristic curve C2 of FIG. 16. Therefore, when measuring the outer diameter of the crankpin 23a, the summed load of the inertial load and the contact pressure acts on the contacting parts while greatly changing as shown by characteristic curve C3 of FIG. 16. On the other hand, the accumulated forces F1, F2, which are applied to the tilt arm 28 by the second spring 72, are expressed by characteristic curve C4 of FIG. 16. The characteristic curve C4 changes in an opposite manner relative to the characteristic curve C3.

Therefore, by applying the accumulated forces F1, F2 of the second spring 72 to the tilt arm 28, the summed load (total load) of the characteristic curve C3, which acts on the contacting parts of the measuring device 41 and the crankpin 23a, and its changes can be suppressed. That is, as the rotation angle of the crankpin 23a changes, the spring accumulated force is adjusted as shown by the appropriate characteristic curve C4. This reduces the fluctuation of the summed load of the characteristic curve C3. As a result, the fluctuation of the comprehensive load acting on the contacting parts is suppressed as shown by characteristic curve C5.

When the rotation radius R2 of the crankpin 23a shown in FIG. 14, the outer measurement R3 of the crankpin 23a, and the rotation speed of the crankpin 23a are changed, the summed load of the characteristic curve C3 acting on the contacting parts is also changed. Therefore, the fluctuation of the comprehensive load shown by the characteristic curve C5 needs to be suppressed by adjusting the accumulated forces F1, F2 in accordance with changes in the summed load of the characteristic curve C3. In the present embodiment, the accumulated forces F1, F2 of the second spring 72 can be changed by replacing the hook member 83 hooked to the second hook pin 74 with another hook member 83 having a hook piece 83b of a different length. This eliminates the necessity of replacing the second spring 72 and allows the accumulated forces F1, F2 of the second spring 72 to be easily adjusted.

Third Embodiment

With reference to FIGS. 17 to 20, a grinding machine according to a third embodiment of the present invention will be described.

In the grinding machine of the present embodiment, the tilt arm 28 in each of the measuring apparatuses 25A, 25B is formed by a first straight portion 28b1 formed on the ring portion 28a, an arcuate portion 28b2, and a second straight portion 28b3. The arcuate portion 28b2 is integrally coupled to the first straight portion 28b1 and coaxial with the ring portion 28a. The center of the arc of the arcuate portion 28b2 coincides with the centers 015, 028. The second straight portion 28b3 is integrally formed with the arcuate portion 28b2 and extends in a different angle. The same measuring device 41 as that in the first embodiment is tiltably supported at the distal end of the second straight portion 28b3. The swing link 60 is formed by a proximal arcuate portion 60a corresponding to the arcuate portion 28b2 and a distal straight portion 60b corresponding to the second straight portion 28b3.

Figure 20:
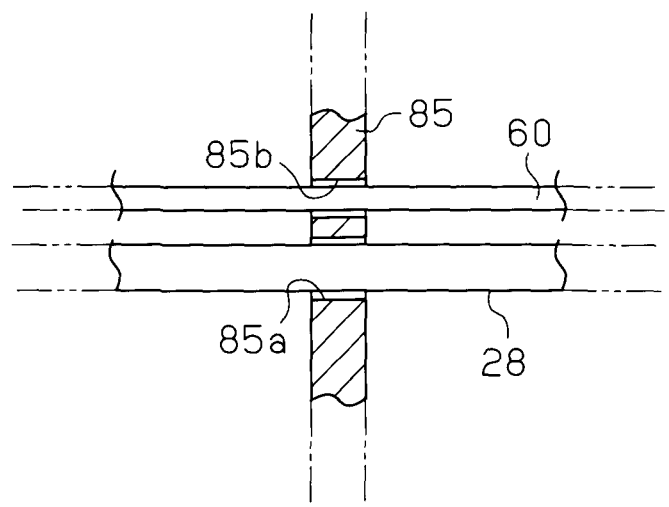
FIG. 20 is a cross-sectional view illustrating a part of a third embodiment.
Figure 21:
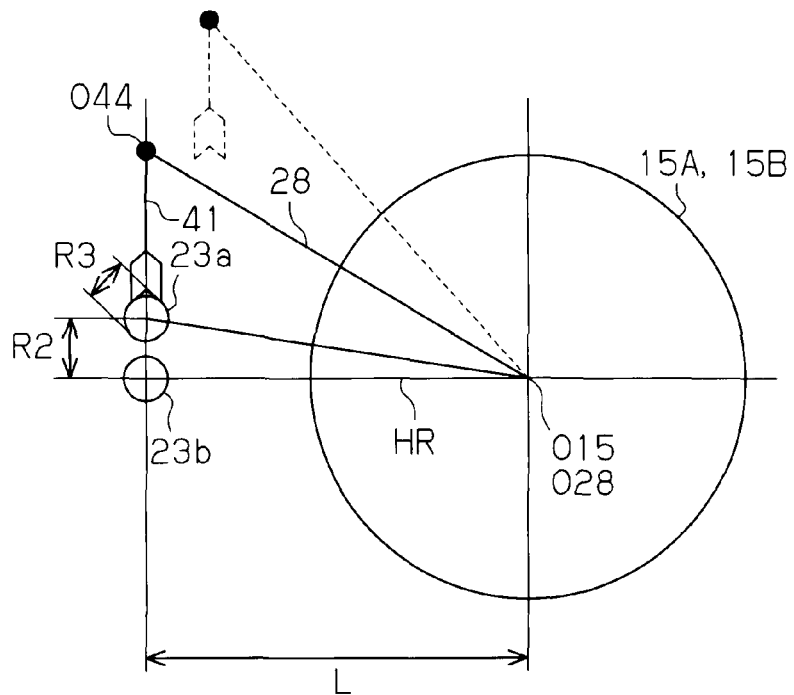
FIG. 21 is a diagram showing operation of a fourth embodiment.
Figure 22:
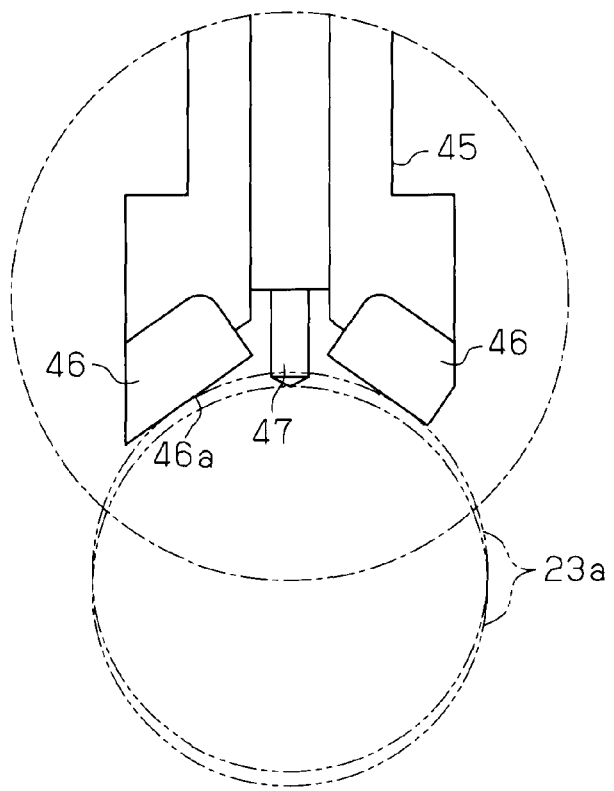
FIG. 22 is an enlarged view showing a pin diameter measuring portion.
Figure 23:
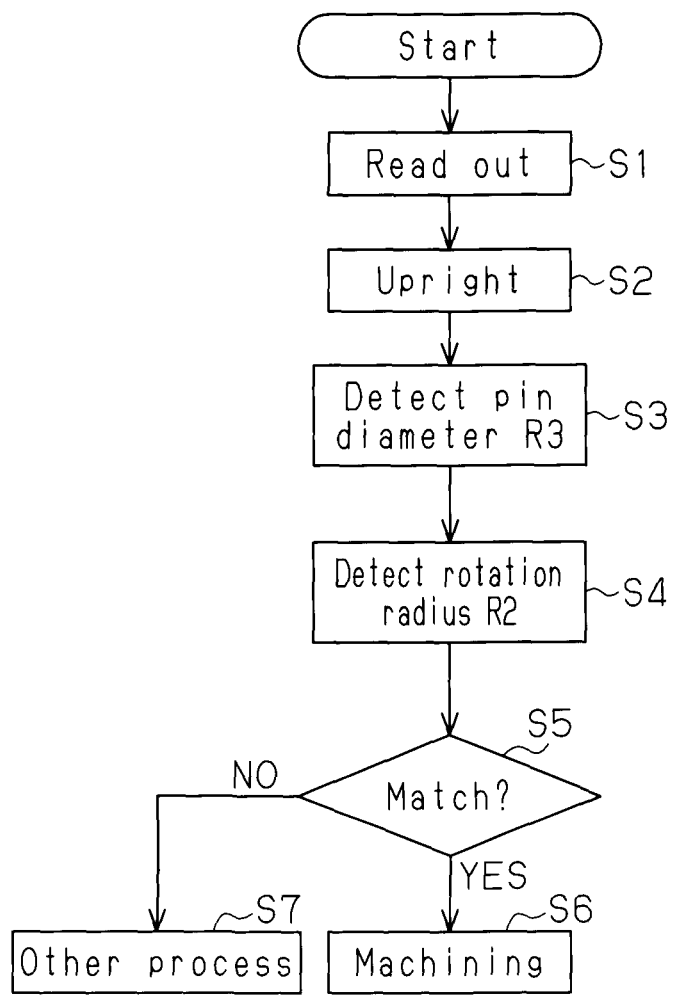
FIG. 23 is a flowchart showing operation of the fourth embodiment.
Figure 24:
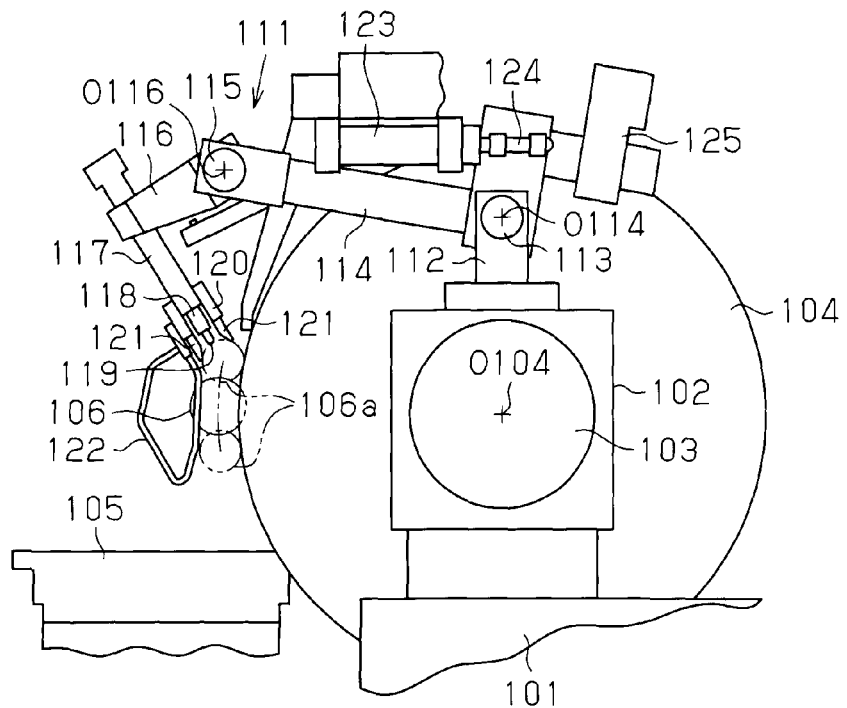
FIG. 24 is a right side view of a prior art grinding machine, illustrating a measuring state of the outer diameter of a crankpin.
Figure 25:
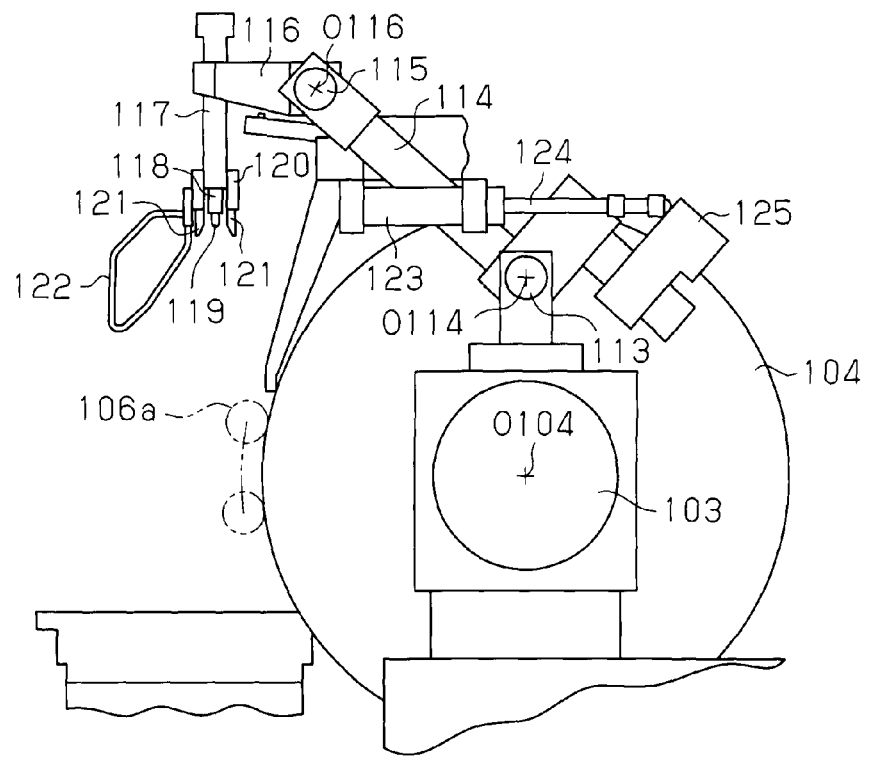
FIG. 25 is a right side view of the prior art grinding machine, illustrating a non-measuring state of the outer diameter of the crankpin.

Another cover 85 is provided in the vicinity of the covers 16A, 16B covering the grindstones 15A, 15B. The cover 85 separates the proximal end of the tilt arm 28 and the position switching mechanism 30 for tilting the tilt arm 28 from a machining chamber 89. As shown in FIG. 20, windows 85a, 85b are formed in the front wall of the cover 85. The windows 85a, 85b are openings the sizes of which are substantially the same as the cross section of the arcuate portion 28b2 of the tilt arm 28 and the arcuate portion 60a of the swing link 60. The arcuate portion 28b2 and the arcuate portion 60a pass through the windows 85a, 85b with a small clearance at the periphery. A blower fan 86 is provided in the cover 85. During grinding of the crankpin 23a, the blower fan 86 delivers air toward the windows 85a, 85b of the cover 85 from inside the cover 85. This prevents coolant from entering the cover 85 through the small clearance between the periphery of the arcuate portion 28b2 and the inner edge of the window 85a.

Therefore, according to the third embodiment, the proximal portion of the tilt arm 28 and the position switching mechanism 30 are prevented from being exposed to coolant during the grinding of the crankpin 23a. That is, even if the tilt arm 28 is tilted, the arcuate portions 28b2, 60a move back and forth only in the windows 85a, 85b, but do not move toward the opening surface. This allows the sizes of the windows 85a, 85b to be minimized. Accordingly, the clearance of the windows 85a, 85b remains small and the entry of the coolant is reduced.

Figure 18:
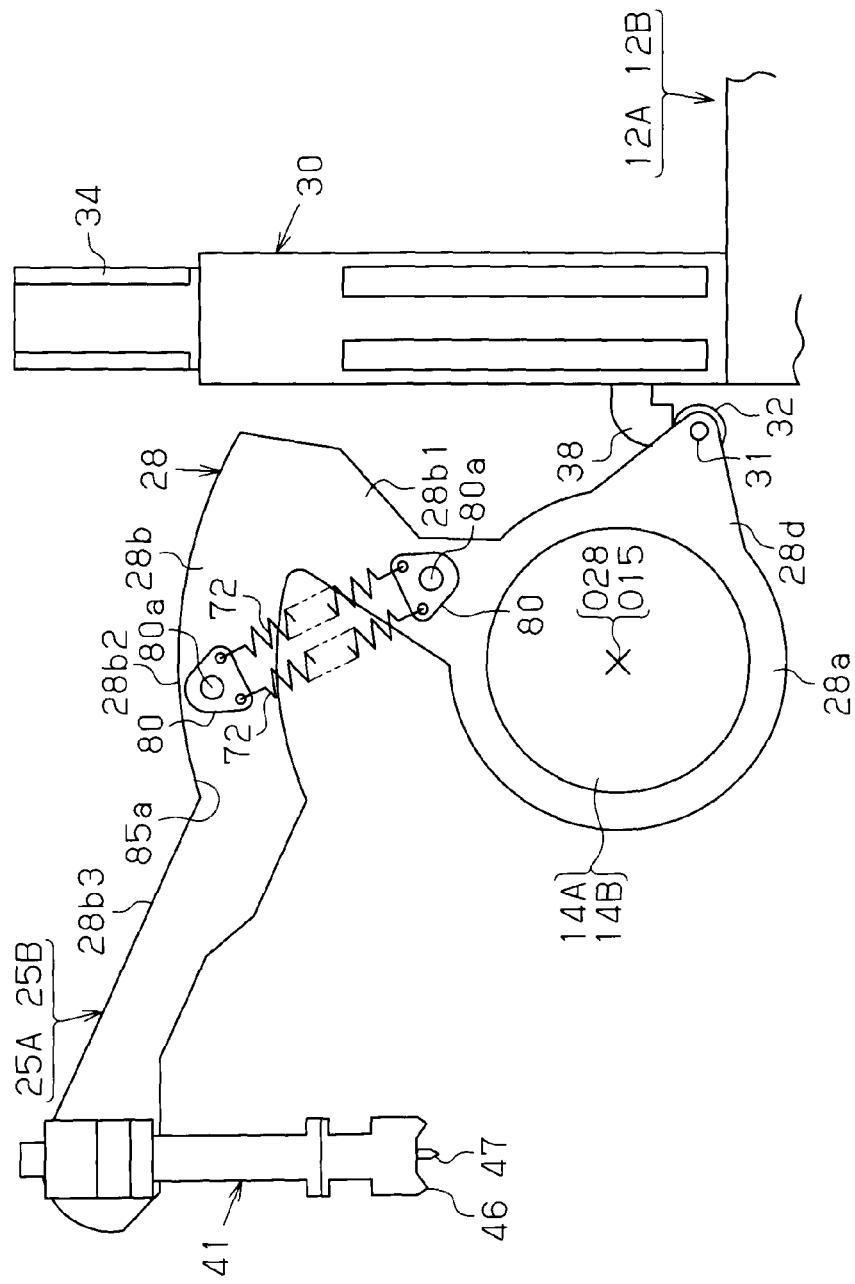
FIG. 18 is a diagrammatic right side view illustrating a part of FIG. 17.
Figure 19:
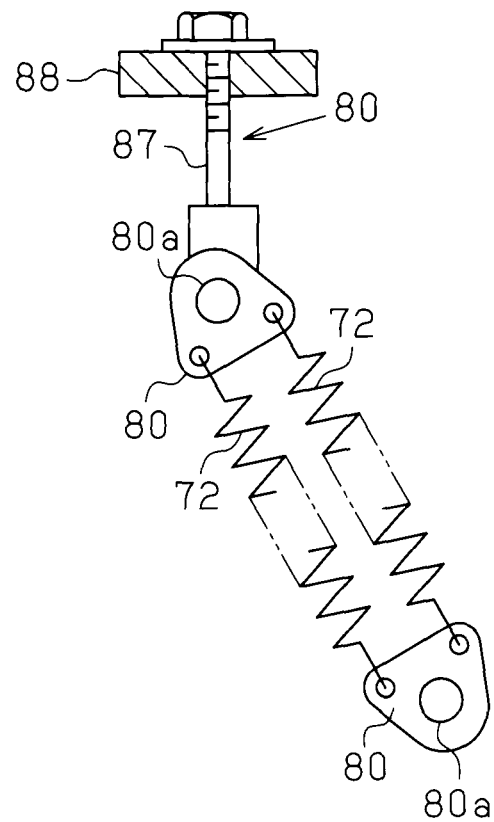
FIG. 19 is a diagrammatic right side view illustrating springs and the related structure.

As shown in FIGS. 18 and 19, a bracket 80 is rotatably supported at the proximal portion of each of the support screw 87 and the tilt arm 28 with a shaft 80a. A pair of second springs 72 is hooked to both sides of the shaft 80a of the bracket 80. The second springs 72 are provided between the brackets 80 while being expanded. The support screw 87 is threaded to an internal thread 88 of a fixing frame of the grinding machine. The spring force of the second springs 72 can be adjusted by changing the threaded position of the support screw 87 relative to the internal thread 88. The support screw 87 and the internal thread 88 form an accumulated force adjusting mechanism 91 serving as load adjusting means. Therefore, in the present embodiment, the fluctuation shown by the characteristic curve C5 shown in FIG. 16 is suppressed by adjusting the accumulated forces F1, F2 of the second springs 72.

Fourth Embodiment

A fourth embodiment of the present invention will now be described with reference to FIGS. 13 and 21 to 23.

The memory section 50 shown in FIG. 13 stores attribute data of the diameter R3 and the rotation radius R2 of crankpins 23a of various types of crankshafts 23 to be machined. The memory section 50 also stores a program of the flowchart shown in FIG. 23. The measuring device 41, the control unit 49, and the memory section 50 form workpiece type identifying means for identifying the type of a workpiece.

When machining is started, the control unit 49 executes the above described program. That is, at the start of the machining, attribute data of a crankshaft 23 to be machined is retrieved from a specific area of the memory section 50 at step S1 of FIG. 23. The retrieved data is retained in the working area of the memory section 50. At step S2, the crankshaft 23 is held between the main spindle devices 19A, 19B, and one of the crankpins 23a is arranged at the top dead center. In this state, the crank arm is arranged to be perpendicular to the horizontal line HR.

Next, at step S3, the servomotor 34 of the position switching mechanism 30 is activated to move the slider 37 and the actuating element 38 upward, so that the gauge 46 of the measuring device 41 is placed on the crankpin 23a. The pin diameter R3 is detected based on the output from the measuring device 41 according to the operation of the measuring pin 47. The detection data is stored in a predetermined area of the memory section 50. In the subsequent step S4, the servomotor 34 is activated to move the slider 37 and the actuating element 38 downward. Accordingly, when the measuring device 41 is raised and the gauge 46 is raised, the position of the measuring pin 47 is changed. The encoder 34a of the servomotor 34 sends detection data corresponding to the current coordinates to the memory section 50. Based on the detection data, the control unit 49 obtains the rotation radius R2 of the crankpin 23a.

Then, at step S6, if it is determined that the pin diameter R3 in the stored attribute data matches with the measured pin diameter R3 and that the length rotation radius R2 of the crankpin 23a in the attribute data matches with the value R2 of the rotation radius of the measured crankpin 23a, it is determined that the crankpin 23a is of a right type. In this case, the machining program is retrieved at step S6, and the machining is started. If the matching is not determined, an alarm is generated at step S7, and a process for discharging the crankshaft 23 is performed.

In this manner, the type of the crankshaft 23 can be identified by using movement of the measuring device 41. This eliminates the necessity for a device dedicated for identifying the crankshaft type.

Modified Embodiments

The above described embodiment may be modified as follows.

The workpiece does not need to be the crankpin shaft 23, but may be a simple shaft.

In the first embodiment, the second spring 72 may be omitted.

The present invention may be applied to a single-head type grinding machine.

The invention claimed is:

1. A grinding machine comprising:
a grindstone;
a tilt arm; and
measuring means provided at a distal portion of the tilt arm,
wherein the grinding machine causes the grindstone to contact a shaft-like workpiece that is rotated about an axis to grind the workpiece, the tilt arm is tilted about another axis, and the measuring means measures an outer diameter of the workpiece, and
wherein the rotation center of the grindstone and the tilt center of the tilt arm are arranged on a common axis, and the measuring means is supported at the distal portion of the tilt arm to be rotatable about an axis parallel to the axis of the tilt arm, the grinding machine further comprising:
adjusting means that adjusts the rotation angle of the measuring means; and
holding means that always maintains the measuring means at a neutral position and allows the measuring means to be rotated by an external force.

2. The grinding machine according to claim 1, wherein the workpiece is a crankshaft, and a crankpin of the rotating crankshaft is ground by reciprocating the grindstone.

3. The grinding machine according to claim 1, comprising:
angle adjusting means for adjusting the tilt angle of the tilt arm, wherein the angle adjusting means is capable of adjusting the position of the measuring means about the tilt center of the tilt arm.

4. The grinding machine according to claim 3, wherein the angle adjusting means includes urging means for urging the tilt arm in one tilting direction and a first motor, the first motor actuating an actuating element, which selectively contacts and separates from the tilt arm, thereby rotating the tilt arm against the urging force of the urging means.

5. The grinding machine according to claim 1, wherein the adjusting means includes a driven lever integrally rotated with the measuring means, another driven lever rotated by drive means, and a link coupling the driven levers together.

6. The grinding machine according to claim 5, wherein the drive means includes a second motor and an actuating element driven by the second motor, the actuating element having an arcuate surface the shape of which conforms to an arc the center of which coincides with the tilt center of the tilt arm, and wherein the arcuate surface is engaged with said another driven lever so that said another driven lever is rotated.

7. The grinding machine according to claim 1, wherein the measuring means is held at the neutral position via force of a spring.

8. A grinding machine comprising:
a grindstone;
a tilt arm; and
measuring means provided at a distal portion of the tilt arm,
wherein the grinding machine causes the grindstone to contact a shaft-like workpiece that is rotated about an axis to grind the workpiece, the tilt arm is tilted about another axis, and the measuring means measures an outer diameter of the workpiece, and
wherein the rotation center of the grindstone and the tilt center of the tilt arm are arranged on a common axis, and the measuring means is supported at the distal portion of the tilt arm to be rotatable about an axis parallel to the axis of the tilt arm, the grinding machine further comprising:
adjusting means that adjusts the rotation angle of the measuring means; and
reducing means that reduces the load due to the weight of the tilt arm and the measuring means when the measuring means is located at a position for measuring the outer diameter of the workpiece.

9. The grinding machine according to claim 8, wherein the reducing means is formed by a spring, wherein, when the spring has passed a dead point, the reducing means reduces the load.

10. The grinding machine according to claim 8, comprising:
load adjusting means for adjusting the degree by which the reducing means reduces the load.

11. The grinding machine according to claim 1, wherein the tilt arm has an arcuate portion the center of which coincides with the center of the tilt arm, wherein the arcuate portion is received in a hole in an apparatus cover.

12. The grinding machine according to claim 5, wherein the tilt arm and the link each have an arcuate portion the center of which coincides with the center of the tilt arm and the center of the link, wherein the arcuate portions are each received in a hole in an apparatus cover.

13. The grinding machine according to claim 1, comprising:
workpiece type identifying means for identifying the type of the workpiece by using the measuring means.

14. The grinding machine according to claim 13, wherein the workpiece type identifying means checks the data of the pin diameter detected by the measuring means and the rotation radius of the crankpin against data of workpiece types stored in advance.

15. The grinding machine according to claim 1, wherein the adjusting means is a means for adjusting the rotation angle of the measuring means.

16. The grinding machine according to claim 8, wherein the adjusting means is a means for adjusting the rotation angle of the measuring means.

17. The grinding machine according to claim 8, wherein the workpiece is a crankshaft, and a crankpin of the rotating crankshaft is ground by reciprocating the grindstone.

18. The grinding machine according to claim 8, comprising:
angle adjusting means for adjusting the tilt angle of the tilt arm, wherein the angle adjusting means is capable of adjusting the position of the measuring means about the tilt center of the tilt arm.

19. A grinding machine comprising:
a grindstone;
a tilt arm; and
measuring device that measures an outer diameter of a shaft-like workpiece, the measuring device being provided at a distal portion of the tilt arm, wherein the grinding machine causes the grindstone to contact the workpiece that is rotated about an axis to grind the workpiece and the tilt arm is tilted about another axis, and wherein the rotation center of the grindstone and the tilt center of the tilt arm are arranged on a common axis, and the measuring device is supported at the distal portion of the tilt arm to be rotatable about an axis parallel to the axis of the tilt arm, the grinding machine further comprising:

adjusting means that adjusts the rotation angle of the measuring device; and holding means that always maintains the measuring device at a neutral position and allows the measuring device to be rotated by an external force.

20. The grinding machine according to claim 19, wherein the measuring device is a means for measuring the outer diameter of the workpiece.

* * * * *